(12) United States Patent
Garceau

(10) Patent No.: US 11,091,130 B2
(45) Date of Patent: Aug. 17, 2021

(54) THREE POINT VEHICLE LEVELING WITH MULTI POINT STABILIZING SYSTEMS

(71) Applicant: NORCO INDUSTRIES, INC., Compton, CA (US)

(72) Inventor: Bernard F. Garceau, Vandalia, MI (US)

(73) Assignee: NORCO INDUSTRIES, INC., Compton, CA (US)

(*) Notice: Subject to any disclaimer, the term of this patent is extended or adjusted under 35 U.S.C. 154(b) by 0 days.

(21) Appl. No.: 16/585,773

(22) Filed: Sep. 27, 2019

(65) Prior Publication Data

US 2020/0047723 A1 Feb. 13, 2020

Related U.S. Application Data

(63) Continuation of application No. 15/654,364, filed on Jul. 19, 2017, now Pat. No. 10,427,654.

(60) Provisional application No. 62/364,152, filed on Jul. 19, 2016, provisional application No. 62/479,385, filed on Mar. 31, 2017.

(51) Int. Cl.
| | |
|---|---|
| *B60S 9/12* | (2006.01) |
| *G05B 11/01* | (2006.01) |
| *B60S 9/16* | (2006.01) |
| *B60S 9/08* | (2006.01) |
| *B60G 17/017* | (2006.01) |
| *B60S 9/02* | (2006.01) |
| *B60S 9/06* | (2006.01) |

(52) U.S. Cl.
CPC .............. *B60S 9/12* (2013.01); *B60G 17/017* (2013.01); *B60S 9/02* (2013.01); *B60S 9/08* (2013.01); *B60S 9/16* (2013.01); *G05B 11/01* (2013.01); *B60S 9/06* (2013.01)

(58) Field of Classification Search
CPC ...... B60S 9/12; B60S 9/02; B60S 9/08; B60S 9/16; B60S 9/06; B60G 17/017; G05B 11/01
See application file for complete search history.

(56) References Cited

U.S. PATENT DOCUMENTS

| | | | |
|---|---|---|---|
| 3,288,435 A * | 11/1966 | Starkey | B60S 9/08 254/420 |
| 3,592,443 A | 7/1971 | Budrow et al. | |
| 4,067,543 A * | 1/1978 | Orth | B60S 9/08 254/425 |
| 4,084,830 A | 4/1978 | Daniel, Jr. et al. | |
| 4,216,939 A | 8/1980 | Valdespino | |
| 4,735,603 A | 4/1988 | Goodson et al. | |
| 5,143,386 A | 9/1992 | Uriarte | |

(Continued)

FOREIGN PATENT DOCUMENTS

| | | |
|---|---|---|
| DE | 4219859 A1 | 12/1993 |
| EP | 2 482 869 | 8/2012 |

(Continued)

*Primary Examiner* — Drew J Brown
(74) *Attorney, Agent, or Firm* — Vorys, Safer, Seymour and Pease LLP; Scott M. Guttman

(57) ABSTRACT

Aspects herein relate to using a three or more points to control the angular orientation of a structure via three or more jacks, and then stabilizing the structure via one or more stabilizers. In some aspects, the foregoing structure may include, for example, a motor home, recreational vehicle, travel trailer or fifth wheel trailer.

20 Claims, 37 Drawing Sheets

(56) References Cited

U.S. PATENT DOCUMENTS

| | | | |
|---|---|---|---|
| 5,176,391 A * | 1/1993 | Schneider | B60G 17/005 |
| | | | 180/41 |
| 6,250,650 B1 | 6/2001 | Douglas | |
| 6,584,385 B1 * | 6/2003 | Ford | B60G 17/0161 |
| | | | 180/41 |
| 6,632,194 B1 | 10/2003 | Mehner et al. | |
| 6,634,461 B1 | 10/2003 | Baker | |
| 7,182,752 B2 | 2/2007 | Stubbs et al. | |
| 7,193,381 B2 | 3/2007 | Ford et al. | |
| 7,199,534 B2 | 4/2007 | Ford et al. | |
| 7,208,896 B2 | 4/2007 | Ford et al. | |
| 7,250,035 B1 | 7/2007 | Ott et al. | |
| 7,285,112 B2 | 10/2007 | Stubbs et al. | |
| 7,338,473 B2 | 3/2008 | Campbell et al. | |
| 7,413,559 B2 | 8/2008 | Stubbs et al. | |
| 7,854,724 B2 | 12/2010 | Stearns et al. | |
| 8,757,637 B2 * | 6/2014 | Tiedge | B60S 9/10 |
| | | | 280/6.153 |
| 9,114,684 B2 | 8/2015 | Maurer | |
| 10,569,607 B1 * | 2/2020 | Alalouf | B60D 1/605 |
| 2003/0135312 A1 | 7/2003 | Ford et al. | |
| 2005/0067227 A1 * | 3/2005 | Wengelski | B60S 9/12 |
| | | | 187/285 |
| 2005/0073141 A1 * | 4/2005 | Baird | B60S 9/08 |
| | | | 280/766.1 |
| 2005/0140759 A1 | 6/2005 | Hilton et al. | |
| 2006/0226612 A1 * | 10/2006 | Smith | B60S 9/08 |
| | | | 280/6.153 |
| 2007/0088275 A1 | 4/2007 | Stearns et al. | |
| 2007/0249990 A1 | 10/2007 | Cosmescu | |
| 2009/0137943 A1 | 5/2009 | Stearns et al. | |
| 2010/0185139 A1 | 7/2010 | Stearns et al. | |
| 2013/0240812 A1 | 9/2013 | Helmich | |
| 2014/0214283 A1 | 7/2014 | Maurer | |
| 2016/0075311 A1 * | 3/2016 | Garceau | B60S 9/12 |
| | | | 701/36 |
| 2018/0127249 A1 * | 5/2018 | Collin | B60S 9/02 |

FOREIGN PATENT DOCUMENTS

| | | |
|---|---|---|
| JP | 2005-287840 A | 10/2005 |
| WO | 2010/042204 A2 | 4/2010 |
| WO | 2011/041387 A1 | 4/2011 |
| WO | 2015/026246 A2 | 2/2015 |

* cited by examiner

THREE POINT VEHICLE LEVELING WITH MULTI POINT STABILIZING SYSTEMS

CROSS-REFERENCE TO RELATED APPLICATIONS

This patent application is a continuation of U.S. patent application Ser. No. 15/654,364, filed on Jul. 19, 2017, now U.S. Pat. No. 10,427,654, which claims priority to U.S. Provisional Patent Application No. 62/364,152, filed Jul. 19, 2016, and U.S. Provisional Patent Application No. 62/479,385, filed Mar. 31, 2017, the disclosures of which are incorporated herein by reference.

TECHNICAL FIELD

The disclosures herein relate in general to control of the orientation of structures utilizing a leveling system having a plurality of jacks that contact the surface at three (3) points, and manipulating the extension and retraction of those jacks via a controller system with integrated sensor.

BACKGROUND

Large structures or vehicles which remain in place for extended periods of time (such as recreational vehicles, or RVs) can benefit from being leveled with respect to the ground on which they are placed. To level such vehicles, a plurality of jacks connected to the frame of the structure are provided, which extend or retract to raise, lower, and adjust the attitude of the structure. Solutions for automatic vehicle leveling rely upon user-actuated or semi-automatic leveling controls which provide feedback. Some automatic solutions have been proposed as well. These solutions utilize two axis tilt sensors which provide analog signals to controllers or signaling components to determine the pitch or roll of the structure with respect to a predefined reference line (e.g., direction of gravity) or plane (e.g., plane perpendicular to direction of gravity).

SUMMARY

Embodiments herein include leveling systems for adjusting an attitude of a structure defining a lateral pitch axis and a longitudinal roll axis. The leveling systems may include at least three leveling zones configured to adjust the attitude of the structure based upon instructions received from a user interface operatively connected to each of the at least three leveling zones, wherein the first leveling zone is configured to level the structure fore and aft about the lateral pitch axis, and wherein the second and third leveling zones are configured to stabilize the structure about the lateral pitch axis and the longitudinal roll axis when deployed after the first leveling zone.

In some examples, the second and third leveling zones are further configured to adjust the attitude of the structure about the lateral pitch axis and the longitudinal roll axis when deployed after deployment of the first leveling zone.

In some examples, each of the leveling zones are manually activated via the user interface.

In some examples, the user interface is configured to control operation of the first leveling zone independent of the second and third leveling zones.

In some examples, the user interface is configured to simultaneously control operation of the second and third leveling zones.

In some examples, the user interface is configured to simultaneously control operation of the second and third leveling zones, and in some of these examples, the user interface includes a switch for extending or retracting the second leveling zone and the third leveling zone together.

In some examples, the user interface is configured to control operation of the second leveling zone and the third leveling zone independent of each other, and in some of these examples, the user interface includes a first leveling switch for extending or retracting the second leveling zone and a second leveling switch for extending or retracting the third leveling zone.

In some examples, the first leveling zone comprises a jack arranged at a front end of the structure. In some of these examples, the second leveling zone and the third leveling zone each comprise a pair of stabilizers, the third leveling zone arranged at a rear end of the structure and the second leveling zone arranged on the structure between the first leveling zone and the third leveling zone. In addition to or instead, in some examples the leveling system further comprises at least one additional pair of jacks arranged between the jack and the rear end of the structure.

In some examples, the structure is a travel trailer and the first leveling zone comprises is a tongue jack arranged at a front end of the travel trailer. In some of these examples, the user interface is integrated into a housing assembly of the tongue jack and in some of these latter examples, the housing assembly includes a lid and a locking mechanism configured to lock the housing assembly when the lid is in a closed position. In some examples, the user interface is integrated into an exterior sidewall of an enclosure of the travel trailer and/or integrated inside an interior compartment of the enclosure.

In some examples, the second leveling zone and the third leveling zone each comprise a stabilizer system, the stabilizer systems each comprising a first stabilizer motor associated with a first stabilizer leg and a second stabilizer motor associated with a second stabilizer leg, the stabilizer motors being configured to extend or retract the stabilizer leg associated therewith in response to a stabilizer signal received from the user interface. In some of these examples, the stabilizer motors each include a mechanical slip clutch configured to inhibit further extension of the stabilizer leg associated therewith after grounding of the stabilizer leg associated therewith. In addition to or instead of the foregoing, in some examples each of the stabilizer systems is configured to cease extension of the first stabilizer leg and/or the second stabilizer leg upon sensing increasing amp draw.

In some examples, the user interface includes a level sensor configured to display an indication of the attitude of the structure, and in some of these examples, the level sensor is a bubble level.

BRIEF DESCRIPTION OF DRAWINGS

To better understand and appreciate the invention, refer to the following detailed description in connection with the accompanying drawings.

DETAILED DESCRIPTION

Figure 1:
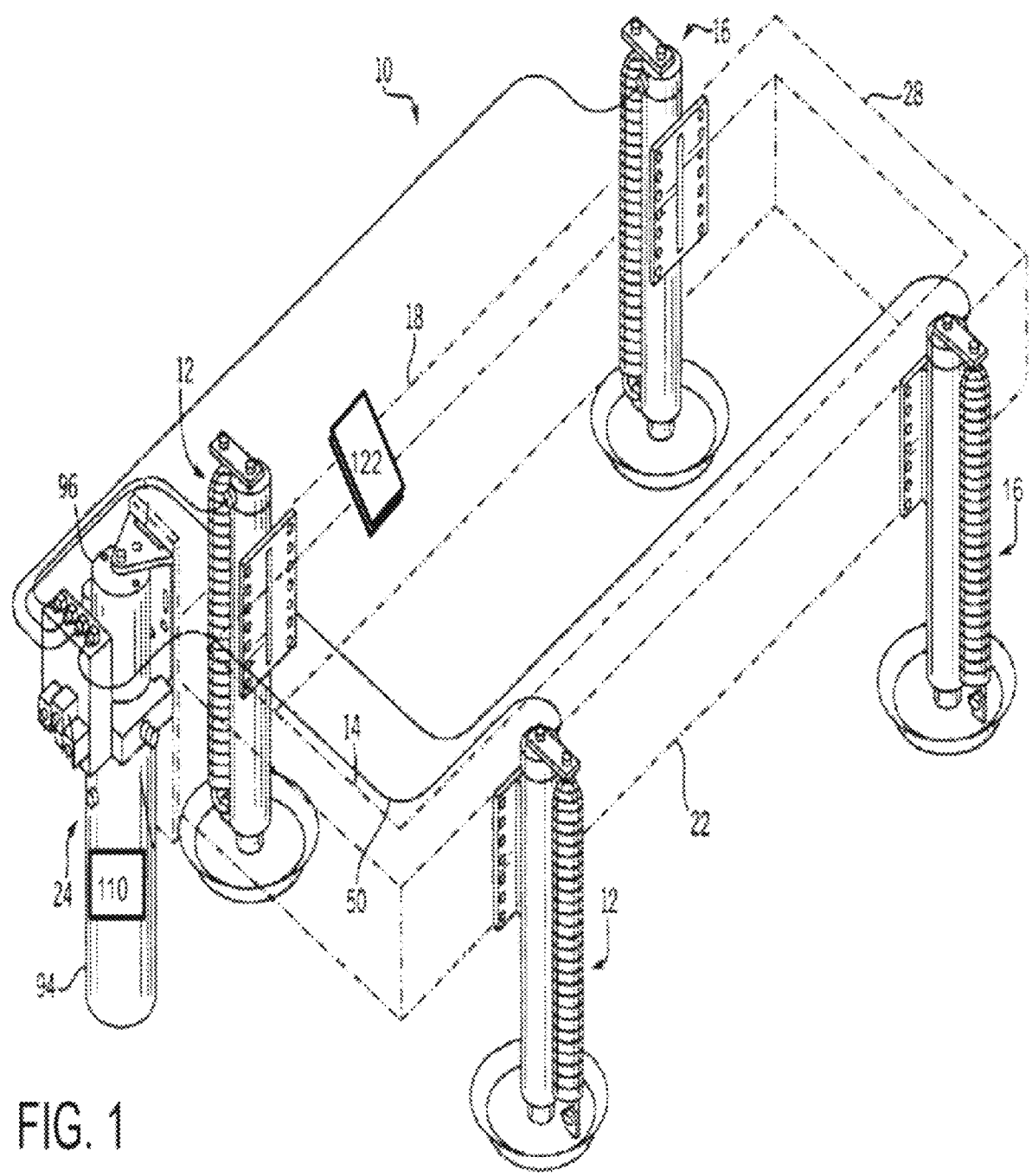
FIG. 1 is an isometric view of the vehicle leveling system installed on the frame of a vehicle such as a recreational vehicle.

A leveling system and method for analyzing the attitude of a platform or structure such as a motor vehicle is described. The leveling system may generally comprise a plurality of "levelers" that are actuated to level a structure, and these levelers may include leveling jacks (sometimes referred to as "jacks") and/or stabilizers (sometimes referred to as "stabilizer jacks"). In some embodiments, the leveling system comprises a plurality of leveling jacks and no stabilizers. In other embodiments, the leveling system comprises a combination of leveling jacks and stabilizers such as, for example, (i) a single leveling jack and a plurality of stabilizers or (ii) a plurality of leveling jacks and one or more pairs of stabilizers. In even other embodiments, the leveling system may comprise a plurality of stabilizers but no leveling jacks such that leveling is achieved via actuation of the stabilizers.

A control system actuates levelers attached to or in contact with the platform or structure using feedback, such as sensor feedback from a 6-axis digital sensor. The 6-axis digital sensor can include a 3-axis gyroscope and 3-axis accelerometer and a processor for interpreting motion data from the gyroscope and accelerometer. Using data from the gyroscope and accelerometer, the attitude (e.g., pitch, roll, or other relative metrics) of the structure can be calculated, and the accelerometer can be used to determine the rate of change of the attitude. Attitude and rate of change can be measured in reference to any point, line, or plane pre-defined or selected while in progress. As detailed herein, leveling may be achieved through actuation of a plurality of levelers and, in these embodiments.

With these arrangements, the leveling controller and associated systems can be programmable to allow for customization. Included in such leveling systems are memory, temperature adjustments, and directional inputs. The accelerometer can be programmable, and in embodiments includes ranges of, for example, ±2 g, ±4 g, ±8 g, and ±16 g. The 6-axis digital sensor can further include on-chip 16-bit ADCs, programmable digital filters, a precision clock with small drift (e.g., 1% or less across a temperature range such as −40° C. to 85° C.), an embedded temperature sensor, and programmable interrupts. The sensor can further include I2C and SPI serial interfaces, a VDD operating range of 1.71 to 3.6V, and a separate digital 10 supply, VDDIO from 1.71V to 3.6V. Sensor communication can occur with registers using, e.g, I2C at 400 kHz or SPI at 1 MHz. In alternative or complementary embodiments, the sensor and interrupt registers may be read using SPI at 20 MHz. Due to the mobile application, the sensor can also be shock-resistant (e.g., supporting 10,000 g shock reliability).

Systems and methods herein can also include security features. Such features can include security codes having lock-out functionality that lock the system down in a level position (in a fully static position or allowing automatic re-leveling but no other activity) to prevent tampering with the vehicle level, theft, et cetera.

Level sensors may be integrated, for example, to the levelers and an automatic control device or user control interface to engage or disengage movement of the leveler or various signals to a user related to the status of a leveling operation.

Various components may be integrated with the control system in addition to the 6-axis digital sensor. The sensor may be connected to a controller having various communication ports (wired and/or wireless), one or more processors, memory (RAM and/or storage), clocks or timers, motors, display devices, and other components typically utilized with jack systems (e.g., hydraulic, electromechanical) and associated controllers.

While embodiments described herein relate at times to leveling assemblies or techniques in a recreational vehicle application, one of ordinary skill in the art will recognize such are readily adaptable to other leveling applications and may be utilized with any suitable structure for the purpose of leveling that structure.

Using information from the 6-axis digital sensor, the controller may modify the leveler extension distances and rates to respond to vehicle dynamics and vehicle attitude. Such modifications may be based upon temperature, and can include, e.g., slowing of the extension rate or pausing the extension due to elevated temperatures. Additionally, the rate may either increase or decrease speeds based upon a rate of change of vehicle dynamics or attitude. Still further, the rate of extension may increase or decrease in speed, or even pause, based upon additional factors such as noise or scale factor. Additional modifications may include retracting a leveler to re-balance or redistribute a load or load component in a more desirable manner. The sensitivity of the 6-axis digital sensor and controller can be calibrated. The sample rate of the 6-axis digital sensor can be constant or dynamic depending on user input (e.g., user dictates rate or rates) or operational context (e.g., initial leveling versus re-leveling, amount of tilt). The controller can limit the speed at which levelers extend, in order to control the amount of angular adjustment in a time period. In alternative or complementary embodiments, the controller can cause one or more levelers to accelerate faster than the standard limited rate to correct for a possible error in operation (e.g., tipping of the structure).

The controller may additionally estimate noise at the 6-axis digital sensor. In an embodiment, noise can be estimated after movement of the leveler has ceased and the system has settled. In further embodiments, the controller can pause or delay any later actuation of the leveler until a static period has passed permitting multiple sensor measurements with the structure and controller constantly oriented. In this fashion, noise estimates can be developed from the variance of successive sensor readings during the static period.

The controller may also change leveler drive rates dynamically to control the tilt rate based upon inputs other than tilt angle. For example, if the amount of over or undershoot measured is beyond a specific threshold the drive rate will be decreased. "Level Stop" readings can be part of the adaptive process that indicates whether further changes are necessary for the next level cycle (e.g., whether stop point accuracy can be further improved).

The controller may automatically select between multiple leveler grounding procedures for the jacks and/or stabilizers based on vehicle conditions (e.g., initial vehicle attitude) and, for example, may infer leveler ground contact from changes in tilt angle without using inputs from discrete sensors. Other sensors related to the levelers may be used as an alternative or supplemental means for inferring such ground contact or other conditions. As used herein in various embodiments, "grounding" can include first contact between (i) any one leveler and a ground surface, (ii) all levelers and a ground surface (or other surfaces), (iii) contact between a portion of or an entire foot surface of a leveler and the ground surface, (iv) the condition when one or more levelers reach a pre-determined load threshold (which can coincide with an amount of force sufficient to meet the pre-determined threshold of weight that the leveler may safely support), (v) the detection of a load on one or more levelers that is below or above a certain threshold, (vi) or various combinations and variants of the above.

In one technique for leveling, the controller levels a vehicle by extending the levelers in pairs parallel to longitudinal pitch and/or lateral roll vehicle axes. The controller detects and corrects the "worst" axis (the axis around which the greatest out-of-level condition exists) first when commencing a leveling operation. Other techniques, such as where levelers are extended singularly, may also be utilized. The technique may be automatically selected, or selected by a user. In embodiments, the user may control an initial leveling, and then turn to automatic selection of leveling thereafter. In the automatic mode, the controller may automatically correct long-term vehicle attitude changes that occur after initial leveling.

The controller may employ adaptive filtering to maximize signal stability based on rate of angular change and estimated signal noise. Through adaptive filtering, controller response to sensor data may be automatically changed depending on at least conditions observed. This allows the controller to automatically manipulate sensor output in different ways to provide a desired result.

Adaptive filtering is accomplished by the controller programmed with a software filter algorithm. In embodiments, the filtering may function as and may be similar to a low pass filter. The order of the filter and the pole location is changed depending on operational mode and noise. When the 6-axis digital sensor is attempting to detect ground contact during initial grounding of the jacks, the 6-axis digital sensor may be very sensitive to changes in movement. While extending the jacks to contact, the order is lowered and the frequency bandwidth is increased. However, when a leveling sequence is in progress and changes are occurring per the predefined rate, higher accuracy may be sought and the signal may be more aggressively filtered.

When levelers (e.g., jacks and/or stabilizers) are not being actuated (in an initialization mode) the continuous sensor reading is checked for the amount of noise that is present when there is no movement (e.g., "no movement" noise). If a lot of "no movement" noise is sensed, the initial filter value is increased accordingly.

During initial extension of the levelers at the beginning of a leveling operation, to ensure a quick and robust leveling sequence, the controller may stop the levelers after they are firmly engaged with the ground but before the structure is level. The adaptive filtering algorithm allows the controller to recognize ground contact by looking at specific output characteristics received from 6-axis digital sensor. Output characteristics monitored may include noise, rate of change, scale factor and temperature.

The adaptive filter algorithm allows an optimal extension sequence to take place and ensures the most reliable sensing of ground contact. In one example embodiment utilizing at least four leveling jacks as the levelers, two jacks are extended simultaneously until the controller senses that the jacks have contacted the ground. The controller then actuates the remaining set(s) of jacks, two at a time, until the controller senses that they have contacted the ground. In response to initial ground contact of all the jacks, the adaptive filter is adjusted and the controller extends each individual jack, one at a time, until all four jacks are firmly grounded. This same leveling sequence may also be followed with respect to leveling systems having a combination of jacks and stabilizers, and for leveling systems that comprise only stabilizers and no jacks.

As is described above, the filter parameters can be changed dynamically to allow a greater sensitivity and to limit excess leveler travel. The order and/or the filter frequency (sample rate and/or shift number) is increased.

Each software mode in the controller can selectively adjust the filter to obtain optimal performance in response, stability, noise immunity, etc. Different variables hold different filtered results and different coefficients depending on modes.

The 6-axis digital sensor is operatively coupled (e.g., capable of communicating with using wired or wireless transmission and reception) to the controller and may be mounted at any point on a vehicle to be leveled. The 6-axis digital sensor is configured to provide digital signals to the controller representing, for example, the degree of longitudinal pitch and lateral roll of a vehicle to which the 6-axis digital sensor is connected. The controller is configured to receive and use those signals to determine vehicle attitude relative to various parameters or values (e.g., a calibrated sensitivity factor and a user-defined zero point). Therefore, a motor vehicle leveling system in accordance with this disclosure allows a user or installer to determine which portion(s) of the vehicle will be level relative to gravity despite the location of the 6-axis digital sensor. The 6-axis digital sensor may, therefore, be located anywhere in the vehicle. The module that houses the 6-axis digital sensor includes a visual to allow an installer to properly orient the 6-axis digital sensor in a vehicle, or may be agnostic of a particular arrangement on the vehicle.

In embodiments, systems and methods herein may include temperature compensation to ensure maximum resolution and stability over a wide range of temperature conditions.

In normal operation, the system may include automatic and/or semiautomatic leveling modes. In both the automatic and the semiautomatic modes, the unit achieves and maintains a level attitude via various leveling algorithms. In embodiments, such algorithms can include a preset relative zero value, an axis-to-level algorithm, and subsequent auto correction feature. The relative zero value can be preset during unit installation and may be used by the controller as a reference value in a "smart" zeroing process. Any relative zero value can be passed to an algorithm that decides how to optimally level the vehicle (e.g., achieve the zero state each time the vehicle is subsequently leveled). Relative zeros can be arbitrary or determined with respect to a point, line (e.g., gravity) or plane (e.g., perpendicular to gravity). The controller can determine an optimum axis sequence that will achieve the zero state with the least overshoot and leveler extension, then executes that sequence by transmitting control signals to the levelers. The controller executes that sequence to level the vehicle either automatically or semi-automatically. In the automatic mode, the controller operates the proper levelers according to the optimum sequence. In the semiautomatic mode, the controller indicates to an operator the proper sequence in which to manually actuate the levelers, according to the optimum axis sequence, but the operator may deviate using at least partial manual control.

The system continuously monitors the attitude of the vehicle after each leveling operation and continues to adjust the levelers as necessary to prevent the vehicle from being tipped out-of-level by such factors as vehicle settling, ground shift, et cetera. The controller continuously monitors values received from the 6-axis digital sensor and, relative to the preset zero state, adjusts the adaptive filter algorithm. The controller further automatically adjusts the vehicle attitude after the vehicle has moved to an out-of-level attitude. In embodiments, adjustments occur when the vehicle has been out-of-level by a threshold amount for longer than a predetermined minimum time period. As the vehicle approaches level and the controller senses that the 6-axis digital sensor is approaching the preset zero state, the filter order can be decreased and the response increased so that phase delay is reduced. In particular embodiments, no individual leveler needs to be actuated during this sequence, only pairs of levelers are activated at any one time.

In either fully automatic or semi-automatic mode, the controller may also dynamically change the rate at which the levelers are actuated. This allows the controller to optimize the leveler extension rate to suit any particular vehicle, surface condition, and/or output data characteristics of the sensor.

Control aspects herein may be implemented using remote devices, including through use of leveling control or visualization applications installed on computers or mobile devices. These remote control aspects, however, may require installation of additional software and/or componentry, such as, a separate controller system or transceiver that allows for communication between the leveling system and the remote device. For example, a software application (an "app") such as a mobile app may be installed on the mobile device such as a "smart phone" to communicate with a controller of the leveling system (e.g., wirelessly through BlueTooth™ or WiFi™ or other wireless protocols, wirelessly through the Internet where the controller is internet-enabled, wired through USB, or others). Similarly, where the leveling system comprises a level sensor (e.g., a six-axis digital sensor), the software application may also communicate therewith. Accordingly, the software application may transmit information to and receive information from the controller and/or six-axis digital sensor.

With information received from the controller and/or the six-axis digital sensor, text or graphics depicting the attitude of the structure can be provided in real-time when the structure is static or in motion. In alternative or complementary embodiments, the software application may include user input options to provide control commands to the controller to manually or semi-automatically effect leveling or other reorientation of the structure. For example, the software application may comprise user inputs similar to those depicted in FIGS. 7C, 7D, and 16; and, therefore, the software application may facilitate either manual or automatic leveling procedures such as those described herein. In further alternative or complementary embodiments, security features may be provided through or built into the software application. For example, a mobile device such as a smart phone may implement a security protocol that may control access (e.g., via password, PIN, code, pattern, biometric scan, and others), and may prevent extension of the levelers, retraction of levelers, initial leveling, re-leveling, energizing of the six-axis digital sensor, transmitting or receiving data to or from the app, or other activity related to leveling or unrelated to leveling (e.g., secure doors or windows) based upon permission granted through successful passing of the security protocol.

Figure 2:
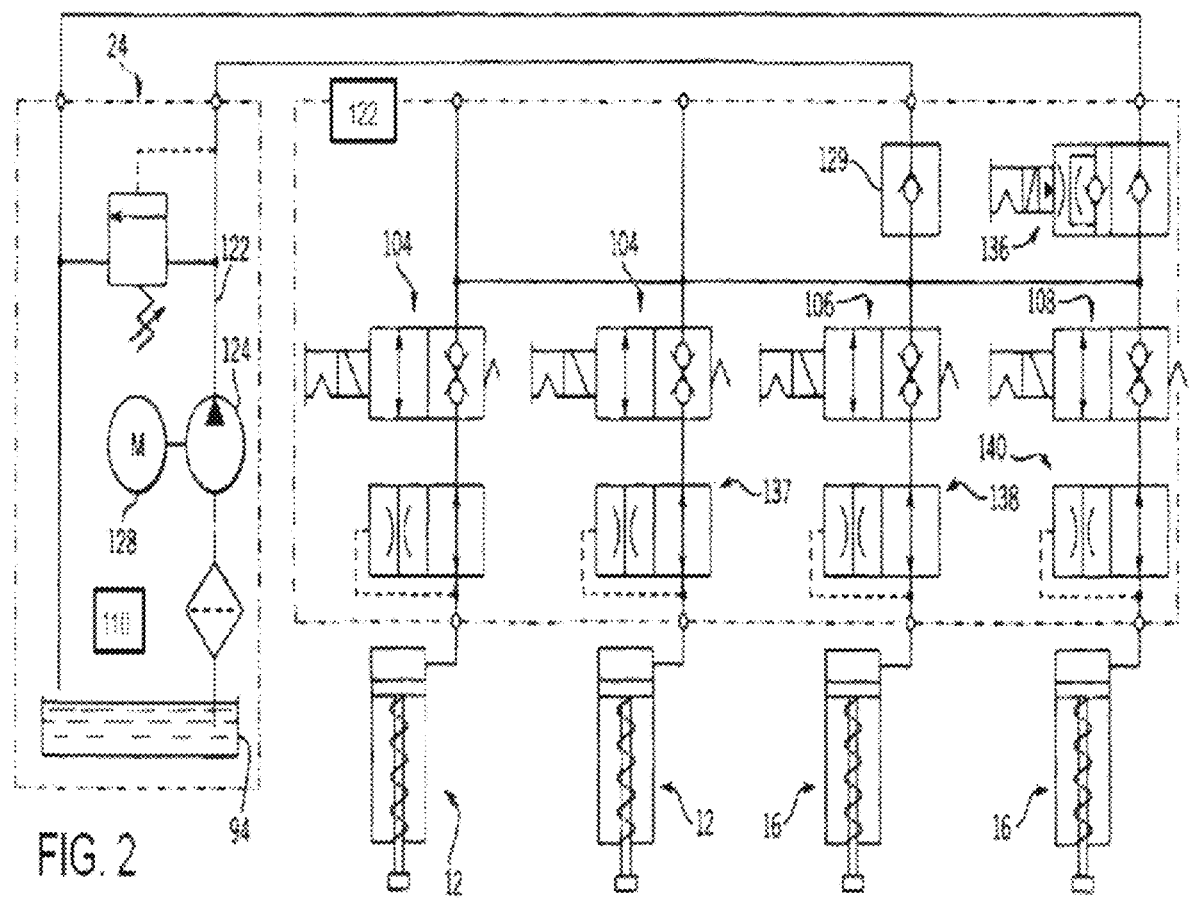
FIG. 2 is a schematic representation of a pseudo four-leg vehicle leveling system in accordance with the invention.

Referring now to FIGS. 1 and 2, a system 10 includes pairs of jacks 12 and 16 for leveling a structure. In the embodiment of FIGS. 1 and 2, hydraulic jacks are employed, but other options will be apparent upon review of the disclosures. The pairs of jacks 12 and 16 can be operated in parallel or independently as individual jacks. In embodiments where jacks are operated in pairs, each pair of jacks 12 and 16 can be in continuous fluid communication.

System 10 includes a 6-axis digital sensor 122, which may be mounted to the vehicle in any satisfactory location. As illustrated, 6-axis digital sensor 122 is mounted to one of the frame members, such as 18. 6-axis digital sensor 122 can be physically or logically interposed between actuator assembly 24 and a controller. 6-axis digital sensor 122 provides data about the angular orientation and rates of change with respect to the structure to a controller. System 10 can further include a control panel 124 to facilitate user interaction with the system.

Actuator assembly 24 includes a controller 110 which receives signals from 6-axis digital sensor 122 to provide control signals to, e.g., motor assembly 96 for control of pairs of jacks 12 and 16. Controller 110 and/or 6-axis digital sensor can communicate by any suitable wired or wireless means.

Supply/return control valve 104 and retraction restricting valve 137 control the flow of hydraulic fluid through passages in an associated valve block to both pairs of jacks 12 and 16. Common passages can include branch points from which hydraulic fluid can be supplied to pairs of jacks 12 and 16 through different passages. Although FIG. 2 shows a branch point being located within the valve block, it may be desirable to locate branch points external to the valve block. Because there are no control valves between the jacks of the pair of jacks 12, the hydraulic fluid pressure in both will equalize during operation.

Pairs of jacks 12 and 16 can be mounted on longitudinal frame members 22 and 18, respectively, at a location close to the front transverse frame member 14. Transverse frame member 28 is located opposite transverse frame member 14. Various lines 50 can provide hydraulic fluid or other operative connectivity between components of system 10. To provide fluid, motor assembly 96 is connected to one or more frame members. Motor assembly 96 includes motor 128 and can provide hydraulic fluid from reservoir 94.

Various valves can assist with management of hydraulic fluid, and can be controlled automatically by their own function, automatically by a controller, or manually. Valves depicted in FIG. 2 include flow control valve 106, supply/return control valve 108, check valve 129, retract control valve 136, and retraction restricting valves 138 and 140. Alternative arrangements can be utilized where a different hydraulic structure or other technology (e.g., electro-mechanical jacks) is employed.

FIGS. 1 and 2 illustrate a vehicle leveling system having four levelers. While various lines and controls are illustrated as coupling or supporting specific levelers or arrangements, these figures are for illustrative purposes only, and alternative or complementary embodiments connecting, coupling, or permitting interaction between different elements is embraced hereunder. There may be more or less than four levelers, and in embodiments including four levelers, less than four levelers, or more than four levelers, all levelers may be actuated independently or in pairs along an axis. In some embodiment there may be three levelers, five levelers, or more; whereas in other embodiments, an even numbers of levelers may be employed.

Figure 3:
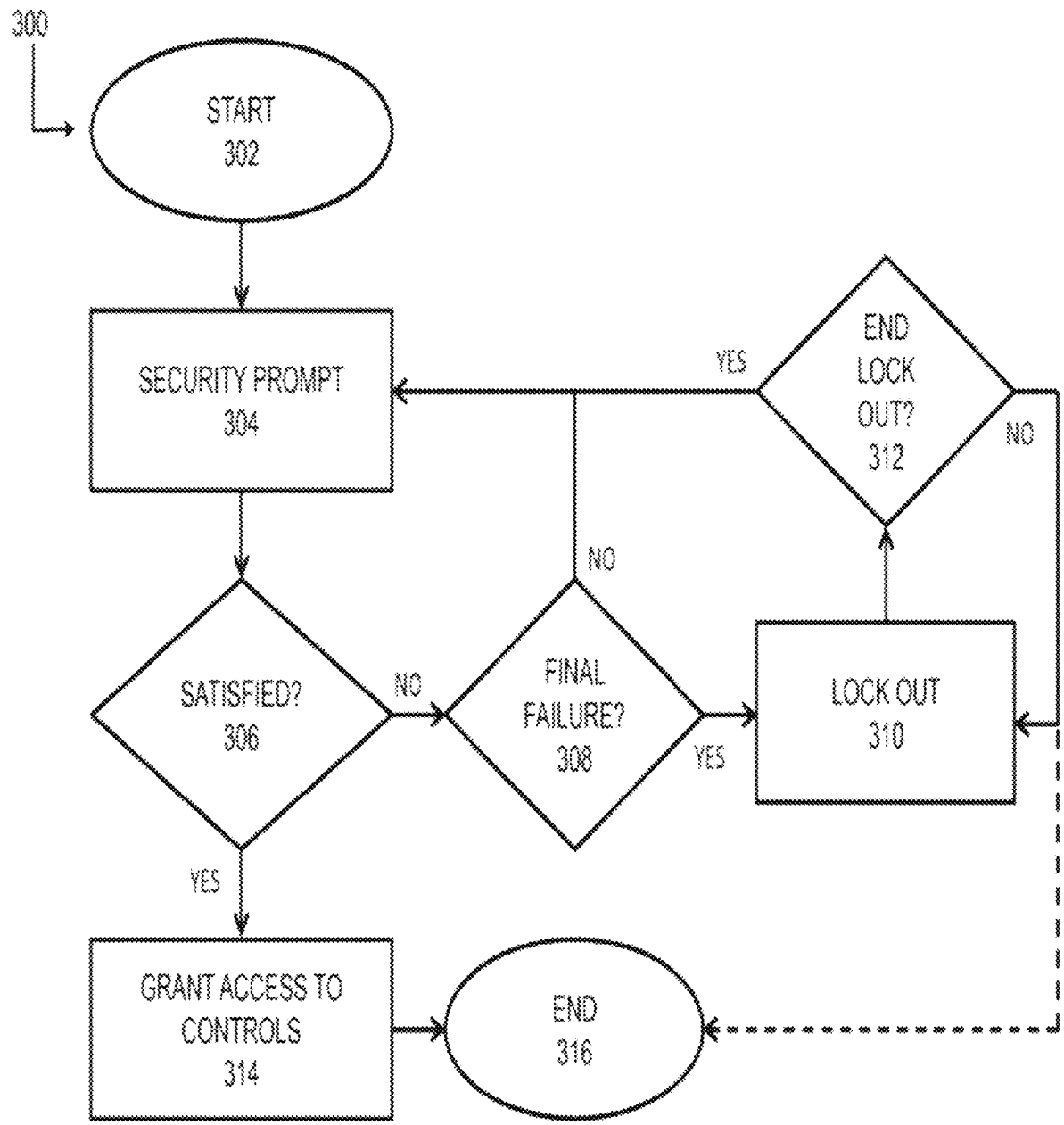
FIG. 3 is a flow chart illustrating a security feature for a jack-leveled vehicle.

FIG. 3 illustrates a flow chart depicting a methodology of securing a power-leveled structure. Methodology 300 begins at 302 and proceeds to 304 where a security prompt is provided. The security prompt can be provided on a dedicated user interface or control panel (e.g., leveling interface for controlling hydraulic or electro-mechanical leveling apparatus in structure), a shared user interface or control panel (e.g., a vehicle dashboard or onboard computer for structure to be leveled), or a third-party device capable of use as an interface (e.g., mobile device or computer with app for communicating with controller and/or six-axis digital sensor installed).

At 304, a determination is made as to whether the security prompt is satisfied. If the prompt is satisfied (e.g., correct password, PIN, code, pattern, biometric input), methodology 300 proceeds to 314 where access is granted to the controls. At 314, the user can view or modify controls in accordance with the permissions and/or controller capabilities. In embodiments, there can be two or more permission levels, such as where a first response to a security prompt at 304 permits the user to view jack or level status, but not transmit controls to modify jack operation or level status. A second security level can permit viewing and modification. After use of the controls is complete subsequent to access being granted at 314, methodology 300 ends at 316.

If the security prompt at 306 is not satisfied, methodology 300 proceeds to 308 where a determination is made as to whether this is a final failure. A final failure may be a first wrong security attempt in more secure systems, or a subsequent wrong security attempt in less secure systems that permit users multiple attempts before lockout. If the determination at 308 returns that the failure to satisfy the security prompt at 304/306 was not a final failure, methodology 300 recycles to 304 where the security prompt is re-presented.

If 308 returns a final failure, methodology 300 advances to 310 where a lock out occurs. The lock out can prevent one or more of viewing of structure level information, modifying structure level status through interaction with the controller, or other aspects. In an embodiment, automatic control can continue (e.g., controller re-levels structure due to settling) without permitting any user access to information or control of such.

After lock out at 310, a determination is made at 312 if the lock out should end (e.g., expiration of timer, keys inserted in ignition, manual override, other condition). If the determination at 312 returns positive, methodology 300 may recycle to 304 (or any other step such as 302). However, if the lockout has not ended, methodology 300 can remain at 310, or alternatively proceed to 316 and end in a lock out condition. In this way, structure tampering, theft, and other unauthorized activities can be discouraged or prevented.

Figure 4:
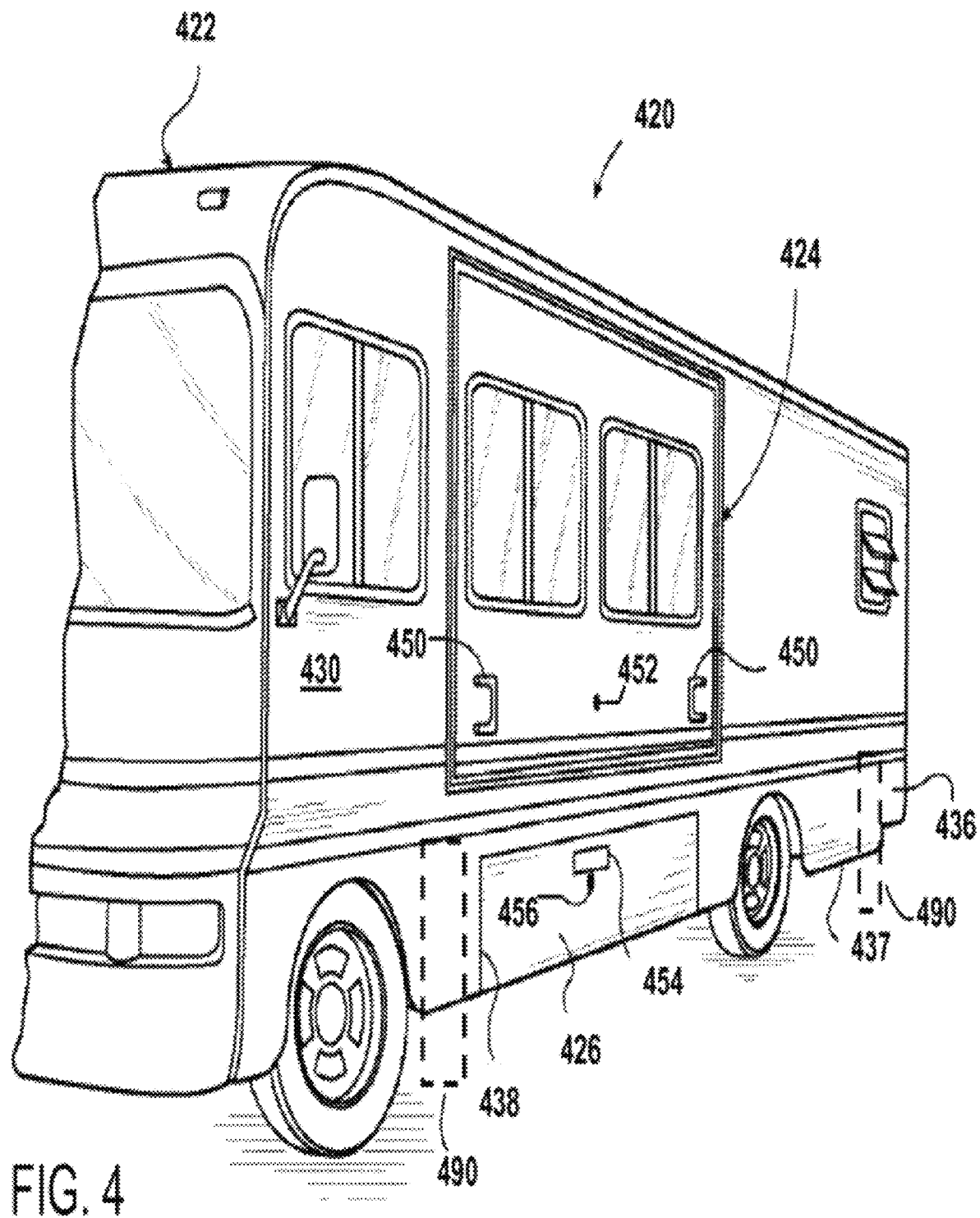
FIG. 4 is a diagram of a jack-leveled vehicle.

FIG. 4 illustrates an example embodiment of a vehicle 420 capable of leveling using the aspects described. Vehicle 420 includes vehicle body 422 including a slideout unit 424. Vehicle 420 further includes storage slideout units 426 and skirt 436. Vehicle body 422 is defined by, e.g., left side wall 430, lower edge 437, and opening 438. Aspects also illustrated include handles 450, lock 452, handle 454, and lock 456.

The vehicle 420 may include one or more levelers such as jacks 490 for leveling at least a portion of vehicle 420. Jacks 490 may be separate components attached to portions of the structure of vehicle 420 (e.g., standalone jacks attached to a vehicle chassis) or embedded within other components (e.g., built into suspension or movable portions of axles of vehicle 420). Jacks 490 may be powered by one or more techniques (e.g., hydraulic, electro-mechanical). Jacks 490 need not be identical, and may be arranged in asymmetrical manners (e.g., to support slideout unit 424 when extended). Jacks 490 are actuated at least in part by a controller which receives feedback from a six-axis digital sensor to assist with the leveling and stability of vehicle 420 when vehicle 420 is parked.

In alternate embodiments, a ground-engaging surface of the levelers may be formed in a variety of sizes and from a variety of materials in order to provide stability between the ground and the levelers such as, for example, jacks 12,16 illustrated in FIGS. 1-2. In such example example, the ground-engaging surface of the jacks 12,16 may include grips made of rubber or other suitable material which provides maximum stability between the ground and the levelers such as jacks 12,16. Further examples of ground-engaging surfaces of jacks 12,16 include surfaces with greater surface area for more unstable ground so as to maximize the distribution of force upon the ground and maximize stability between the ground and the levelers such as jacks 12,16.

Still further alternate embodiments may include a hinge connecting levelers such as jacks 12, 16 to the longitudinal frame members 18, 22. In this way, the jacks 12, 16 will be able to further maximize stability through the use of one or more pistons by counteracting any weather forces in addition to providing stability upon an uneven surface, such as an incline or decline. For example, the hinges (or other angular displacement elements) on jacks 12, 16 allow the jacks 12, 16 to move in additional manners and deviate from a relatively fixed arrangement with respect to longitudinal frame members 18,22 in the event that desired stability may be achieved through an alternate arrangement in which the jacks 12,16 are angled away from longitudinal frame members 18,22 and the one or more pistons assist in stabilizing the jacks 12,16. In such arrangements, doors, windows, or angled wall portions may be provided to avoid contact between other components and jacks 12,16 when extended on angle. Further, jacks 12,16 may be attached to an angular displacement motor that controls the rotation or angle at which one or more of jacks 12,16 extend. Such an event may include a period of forceful winds in which maximum stability would be impossible if the jacks 12,16 were in a rigid, perpendicular arrangement with longitudinal frame members 18,22. Still further, the portion of the jacks 12,16 connecting the body of the jacks 12,16 to the ground-engaging surface of the jacks 12,16 may also include an additional hinge and one or more pistons to provide yet another means of maximizing stability upon an uneven surface or in the wake of a counteracting force. In such arrangements, the jacks 12,16 may be mounted on the external surface of a vehicle 420 or on a moveable panel located on the vehicle 420, but those skilled in the art will recognize that a variety of arrangements may be utilized, such as the levelers (i.e., jacks 12,16) being located under the chassis of the vehicle 420.

In embodiments permitting grounding of levelers such as jacks 12,16 at an angle relative to the primary surfaces of vehicle body 422, controller 110 or other components may control loading and unloading of jacks 12,16 based on the angles. In embodiments, one or more angular measuring components may be associated with one or more jacks 12,16 capable of being extended at an angle. In alternative embodiments, jack loading sensors (or motor loading sensors) may detect loads and load components on respective elements with which they are coupled. In this manner, controller 110 or other components may limit stroke length or the angle (with respect to, e.g., a component of vehicle body 422, the direction of gravity, the ground, a plane defined by the vehicle based on its resting on uneven ground, et cetera) of jacks 12,16 to prevent configurations in which not all jacks can be grounded or one jack or associated motor will be overloaded. Thus, angular arrangements may be assumed without exceeding safety factors for leveler loading (in total magnitude or with respect to a particular force component) or the balance of vehicle 420, or without exceeding the capabilities of an associated motor or other component. In embodiments, an angular solution may be calculated based on the position of vehicle 420, surrounding terrain, and environmental conditions, and the levelers may be extended at various angles during loading in response.

Figure 5:
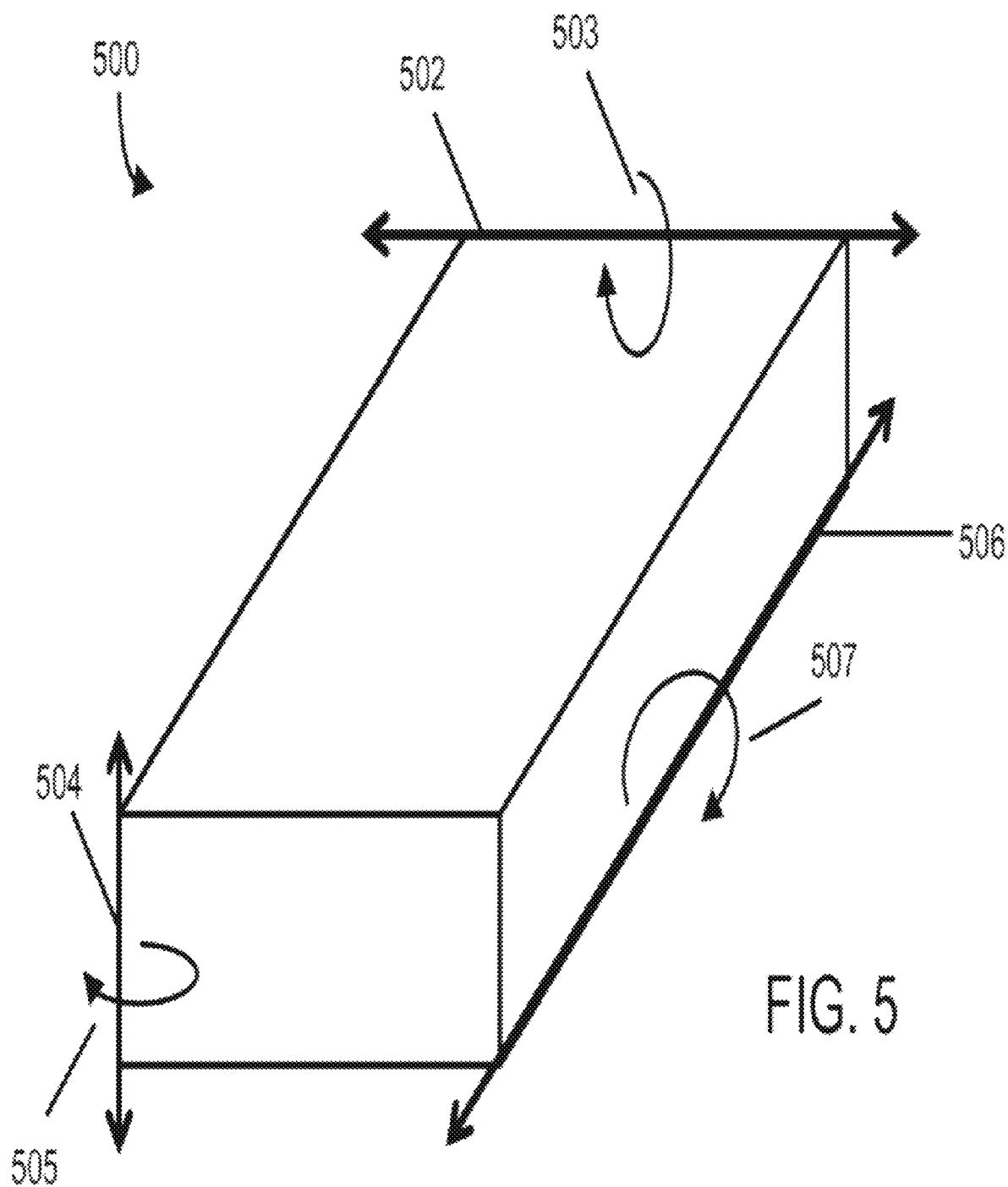
FIG. 5 is a diagram of axes of a vehicle.

FIG. 5 illustrates a diagram of the axes of a structure such as a vehicle 500. Longitudinal roll axis 506 extends in a direction parallel to a straight line extending from a front of the vehicle 500 to a back of the vehicle 500. Longitudinal roll axis 506 runs along the same line as longitudinal frame member 22, as shown in FIG. 1. As illustrated, the vehicle 500 may move or "roll" about the longitudinal roll axis 506 as indicated via arrow 507, and this "roll" movement will raise or lower the vehicle 500 side to side. Lateral pitch axis 502 extends in a direction parallel to a straight line extending from a left side of the vehicle 500 to a right side of the vehicle 500. Lateral pitch axis 502 runs along the same line as transverse frame member 28, as shown in FIG. 1. As illustrated, the vehicle 500 may move about the lateral pitch axis 502 via a "pitch movement" as indicated via arrow 503, and this pitch movement will raise or lower the vehicle 500 fore and aft. FIG. 5 also illustrates a vertical yaw axis 504 that extends perpendicular through to the vehicle 500, and motion about the vertical yaw axis 504 is a yaw movement as illustrated by arrow 505.

FIGS. 6-16 generally disclose alternate embodiments of leveling systems that may be utilized to level large structures or vehicles that remain in place for extended periods of time such as, for example, travel trailers and fifth wheel trailers. These embodiments may be conceptualized as three (3) point leveling systems, five (5) point leveling systems, or even seven (7) point leveling systems depending on the manner in which the levelers are actuated to make contact with the ground; however, those skilled in the art will appreciate that the embodiments disclosed herein may be further modified to have any other number of ground contact points and may thus be conceptualized as an "n" point leveling system where "n" represents the number of ground contact points. Accordingly, leveling may be achieved utilizing various combinations of levelers. For example, a leveling system may comprise any of the following (i) a plurality of leveling jacks and no stabilizers, (ii) a plurality of leveling jacks and one or more stabilizer jacks (or one or more pairs of stabilizers), (iii) a plurality of stabilizer jacks (or pairs of stabilizer jacks) and at least one leveling jack, (iv) a plurality of stabilizer jacks and no leveling jacks, etc. It will be appreciated that, regardless of the combination of levelers utilized, the levelers may be provided in pairs such that the pairs of levelers may be controlled and operated in tandem. Alternatively, each of the levelers (or each of the pair of levelers) may be controlled and operated independently regardless of whether it is configured as a pair.

Figure 7A:
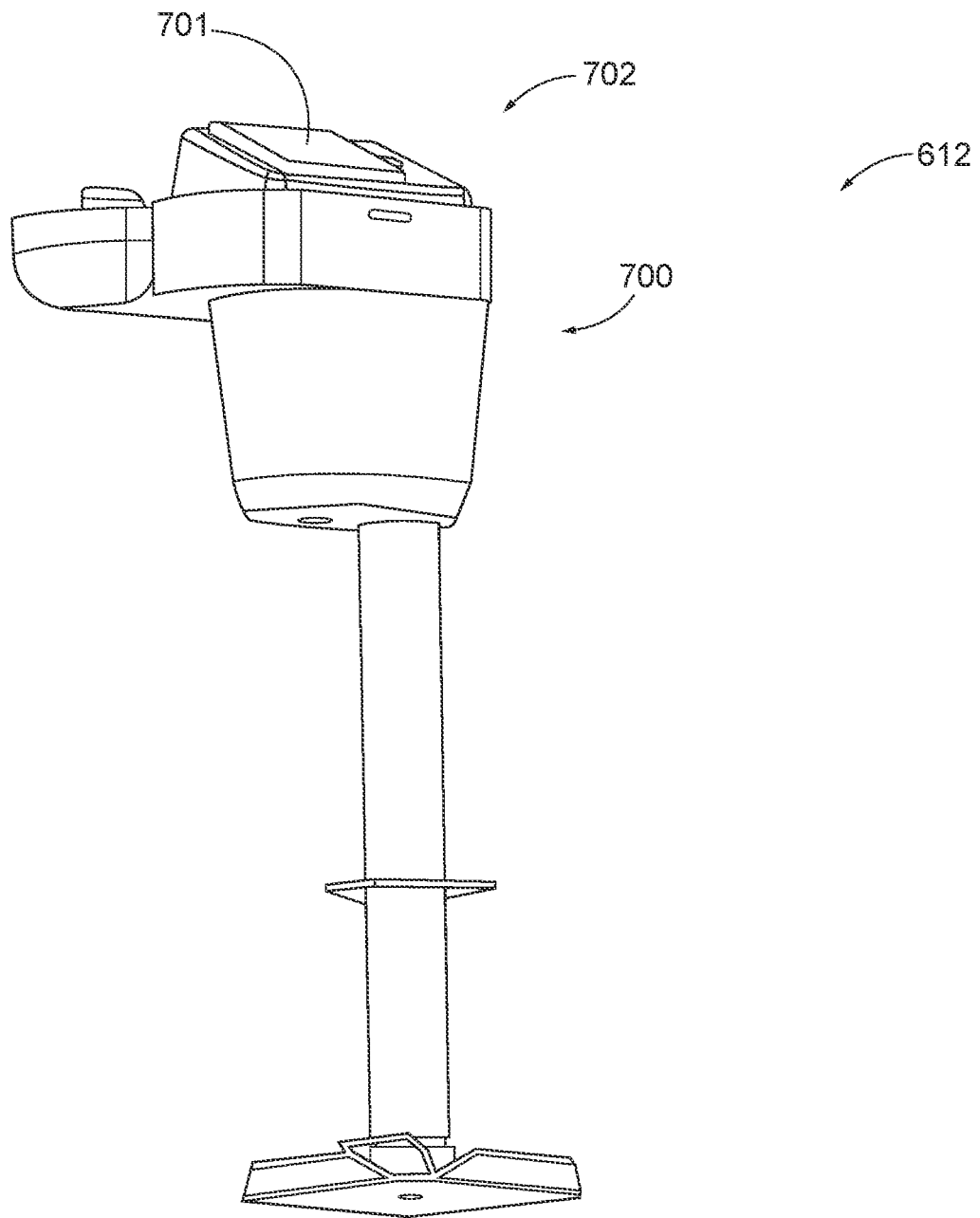
FIGS. 7A-7D illustrate various views of an exemplary tongue jack with integrated user control assembly
Figure 7B:
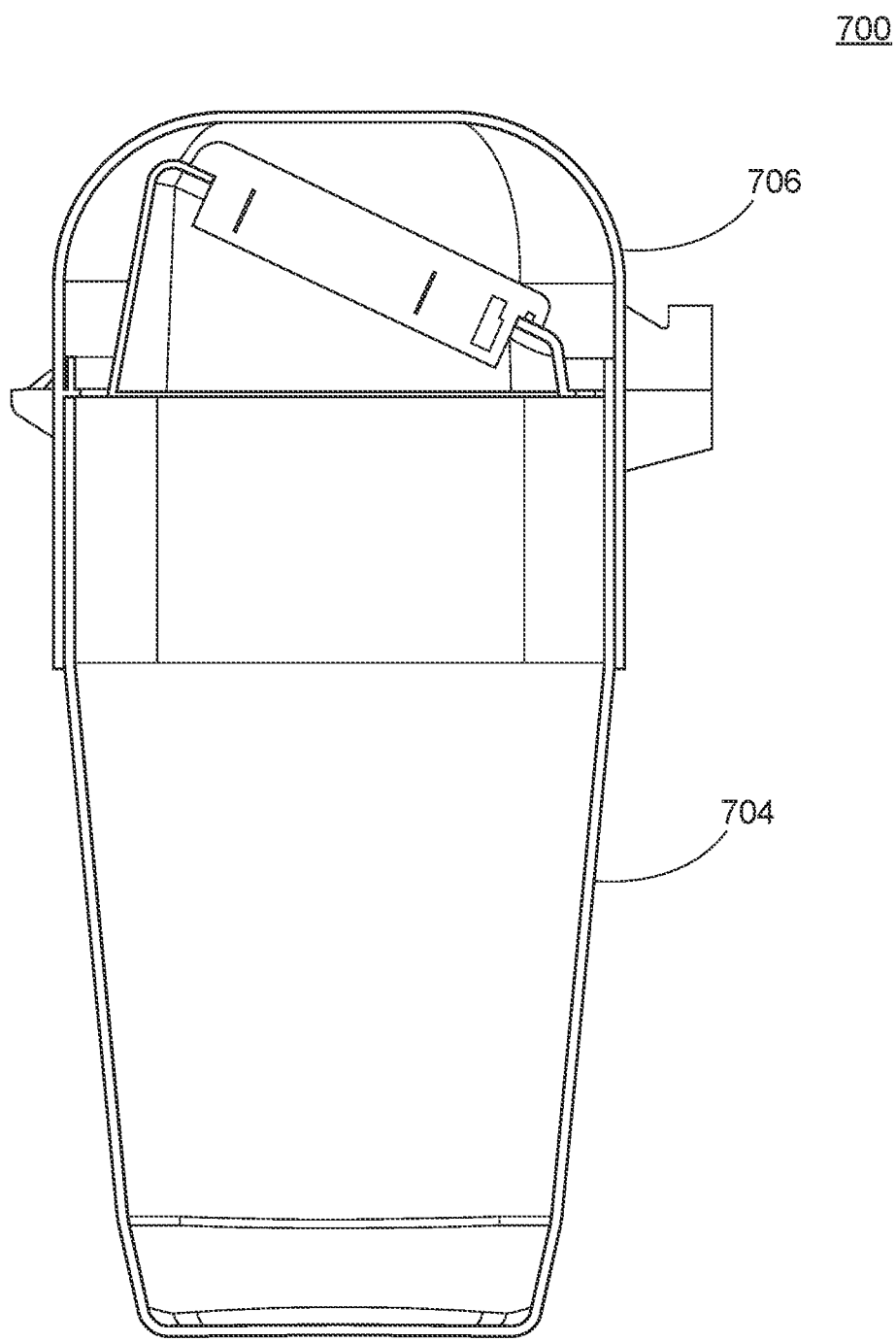
Figure 7C:
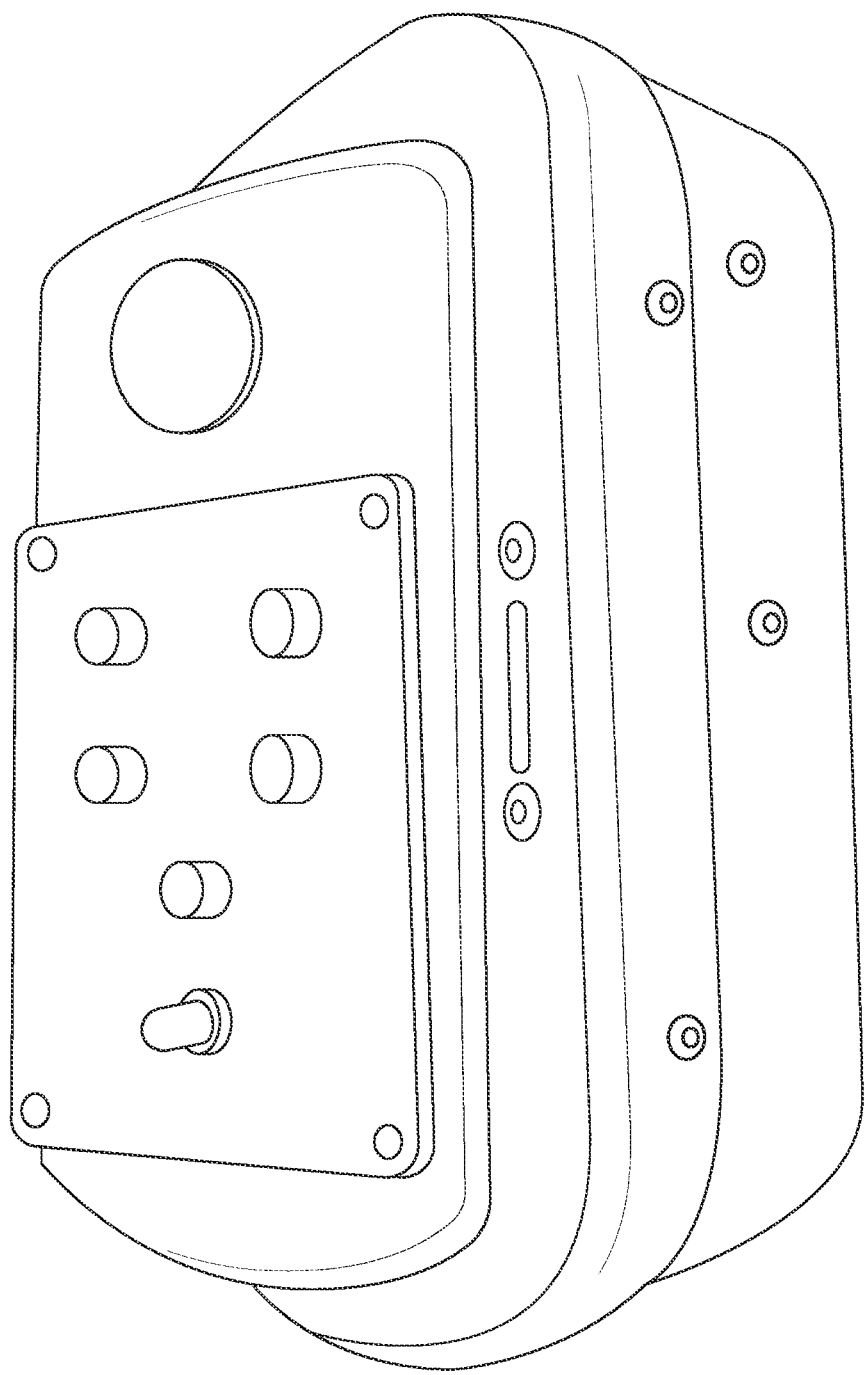
Figure 7D:
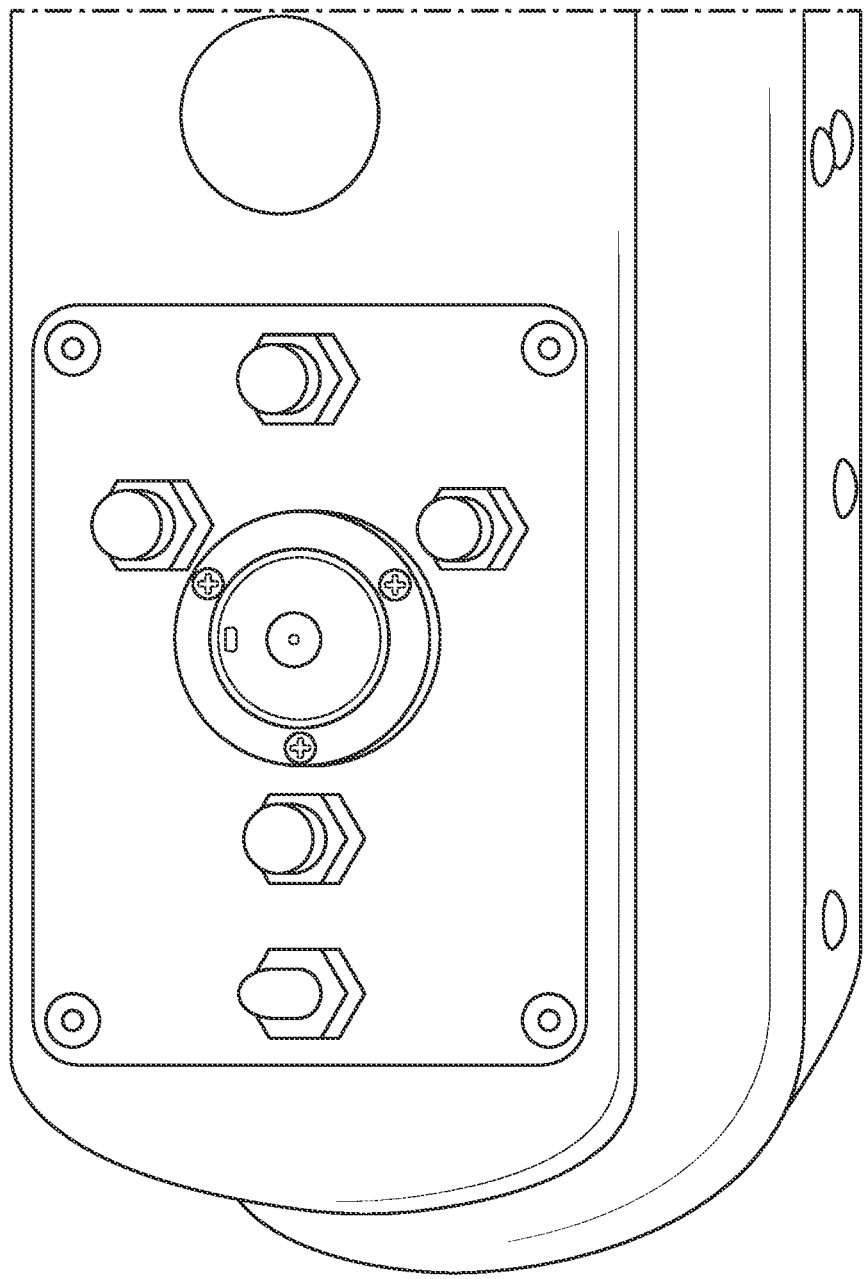
Figure 8:
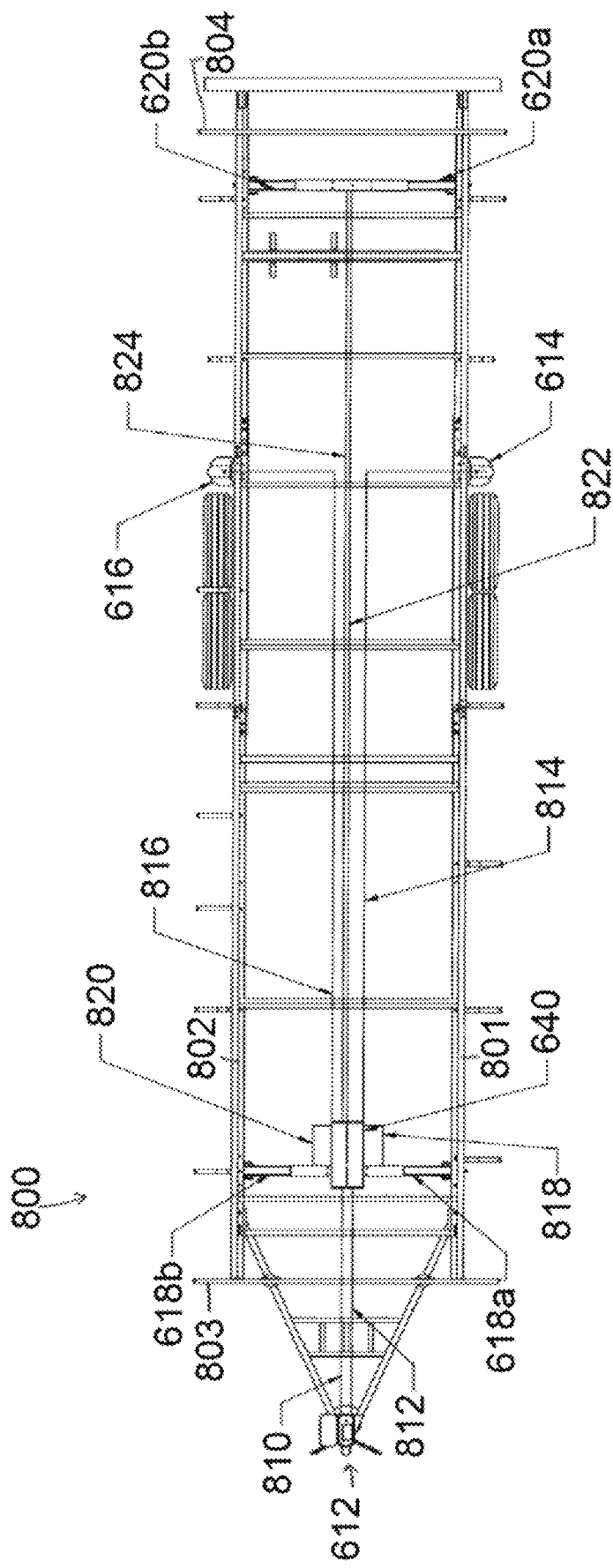
FIG. 8 is a top view of a travel trailer having the leveling system illustrated in FIGS. 6A-6C.
Figure 9A:
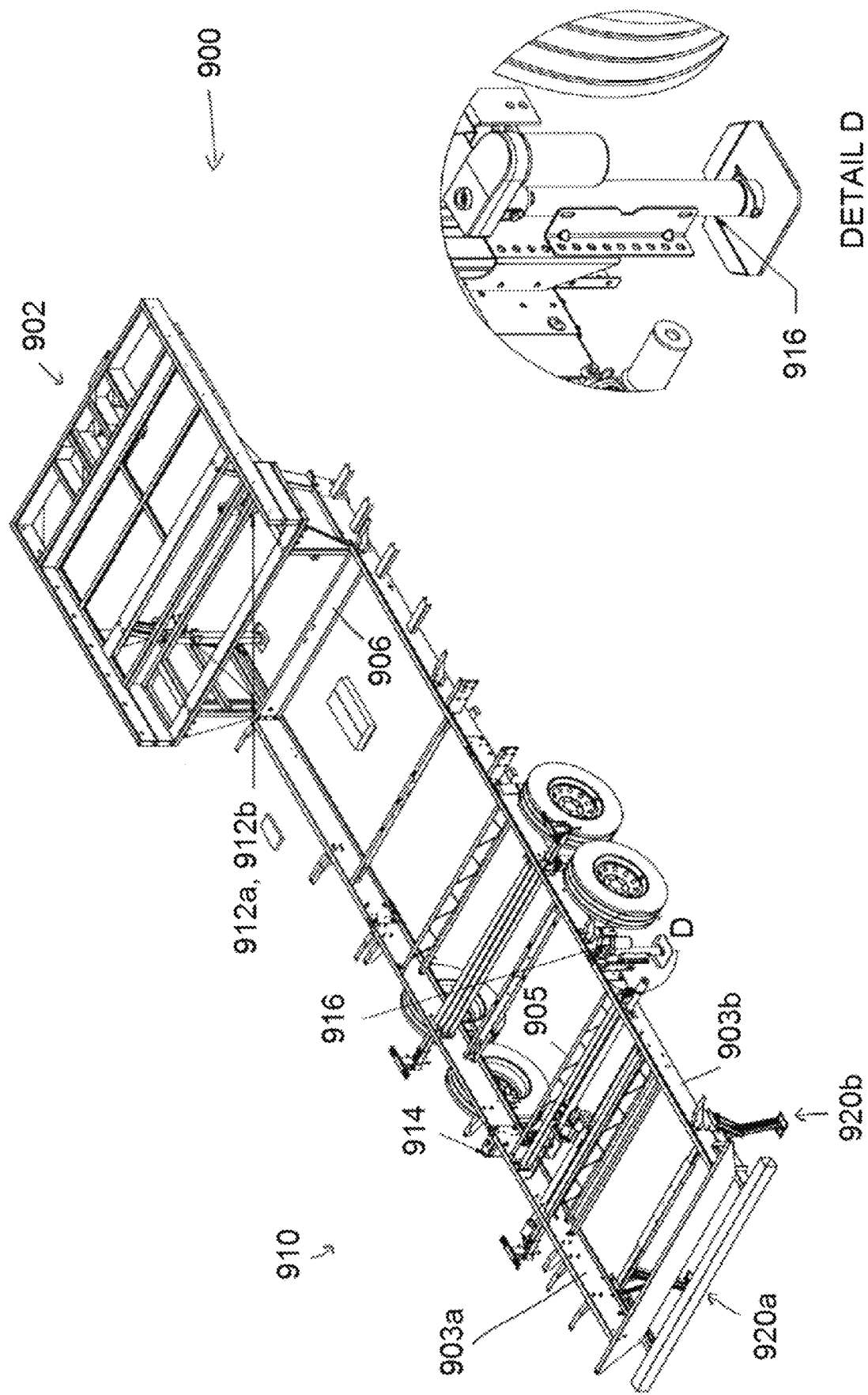
FIGS. 9A-9C are various isometric views of a fifth wheel trailer frame with an exemplary multi-point leveling system.
Figure 9B:
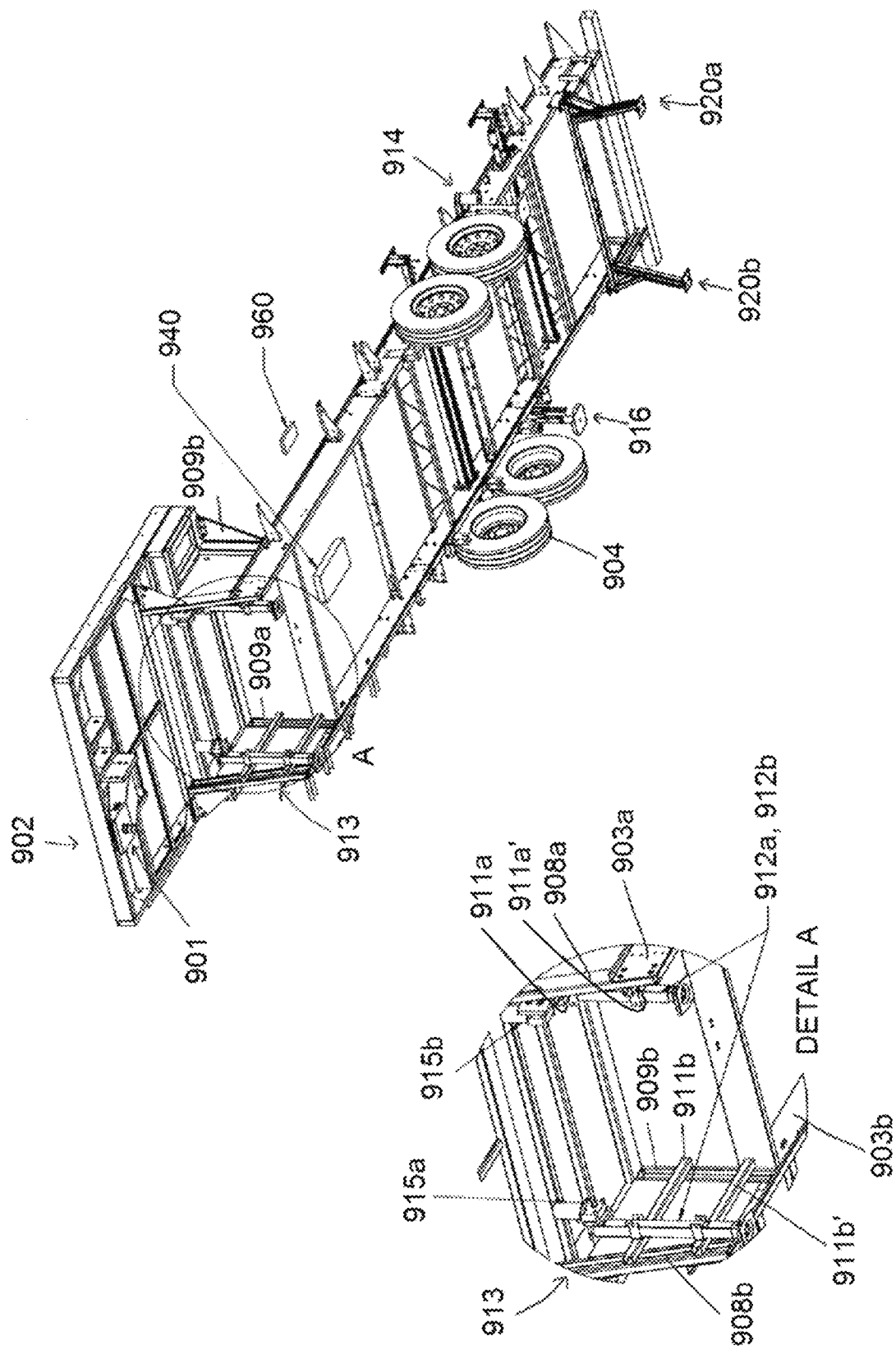
Figure 9C:
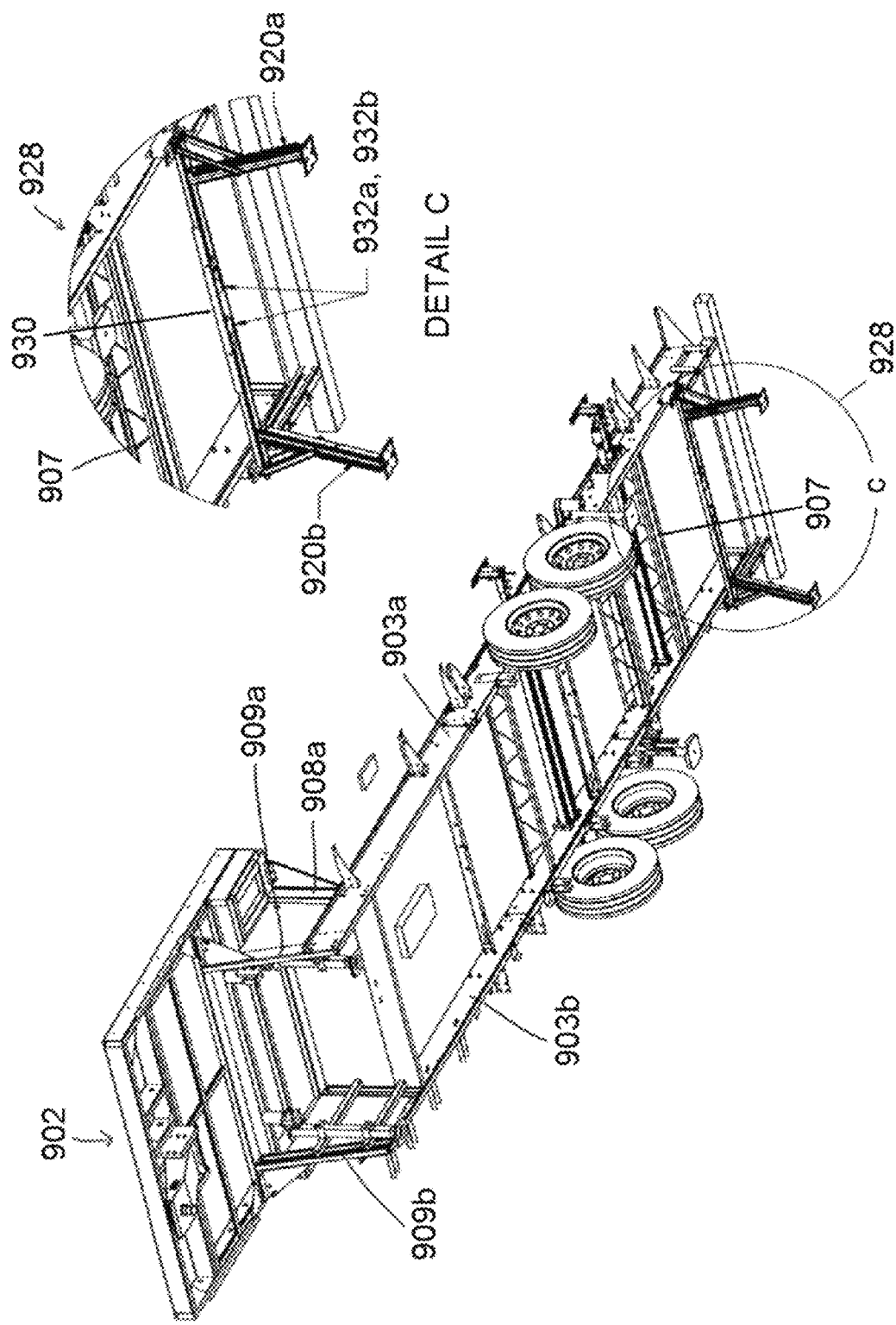

Specifically with regard to a travel trailer frame 600, FIGS. 6-8 depict the various elements of a three (3) point leveling system 610 having three (3) independent leveling jacks. In this embodiment, the leveling system 610 may also comprise an optional pair of stabilizers and may thus be conceptualized as a five (5) point leveling system, where the first three (3) points correspond to the three (3) leveling jacks (i.e., leveling jacks 612, 614, and 616), and the second two (2) points of stabilization correspond to the pair of front stabilizers (e.g., 618a,618b). The three (3) point leveling system 610 may even be conceptualized as a seven (7) point leveling system by including an additional optional pair of rear stabilizers (e.g., 620a,620b) that further enhance stability. As mentioned above, it will be appreciated that, in other embodiments, this leveling system may comprise different configurations of jacks and/or stabilizers, such as example embodiments that utilize rear stabilizers instead of rear leveling jacks (614,616). For example, a leveling system may comprise a front jack (e.g., 612) and one or more independently operable pairs of rear stabilizers (e.g., 618a, 618b and/or 620a,620b) instead of rear leveling jacks (614, 616). In other embodiments, the leveling system may comprise a front jack (e.g., 612) and a plurality of independently operated single stabilizer jacks (e.g., 618a,618b,620a,620b) instead of rear leveling jacks (614,616). It will thus be appreciated that leveling systems including both jacks and one or more stabilizers may be conceptualized as three (3) point leveling systems with multi point stabilization.

With regard to fifth wheel trailers as illustrated in FIGS. 9-12, three (3) point leveling systems (such as three (3) point leveling systems 910 and 1110) may include three (3) leveling jacks; and that such three (3) point leveling systems may be conceptualized as five (5) point leveling systems by adding optional points of stabilization, for example, by adding stabilizers or pairs of stabilizers (i.e., a first pair of front or back stabilizers that enhance stability). Moreover, three (3) point leveling systems 910 and 1110 may conceptualized as seven (7) point leveling systems by adding a second pair of (back or front) stabilizers that further enhance stability. As detailed herein, it will be appreciated that alternate embodiments of these leveling systems may be provided that utilize one or more rear stabilizers (or one or more pairs of stabilizers) instead of rear leveling jacks. It will also be appreciated that leveling systems including both jacks and one or more stabilizers may be conceptualized as three (3) point leveling systems with multi point stabilization.

As used herein, the term "point" refers to a location or region where a leveler such as a leveling jack or stabilizer makes contact with the ground, and may be used interchangeably with the term "zone."

The manner in which the travel trailer leveling system and fifth wheel leveling systems operate are similar, but the mechanical componentry utilized therein may differ. These leveling systems may comprise any number of automated leveling sequences. Alternatively, these leveling systems may be manually operated without motor control, whereby the user decides which leveler to activate (and by how much to extend or retract such leveler) based on, for example, the user's visual inspection of the structure to be leveled, or some other feedback, for example, that provided by a user's visual inspection of bubble level(s) that may be mounted about the structure. In these alternate embodiments, the user may manually activate each leveler one at a time or may activate them in groups.

Figure 6A:
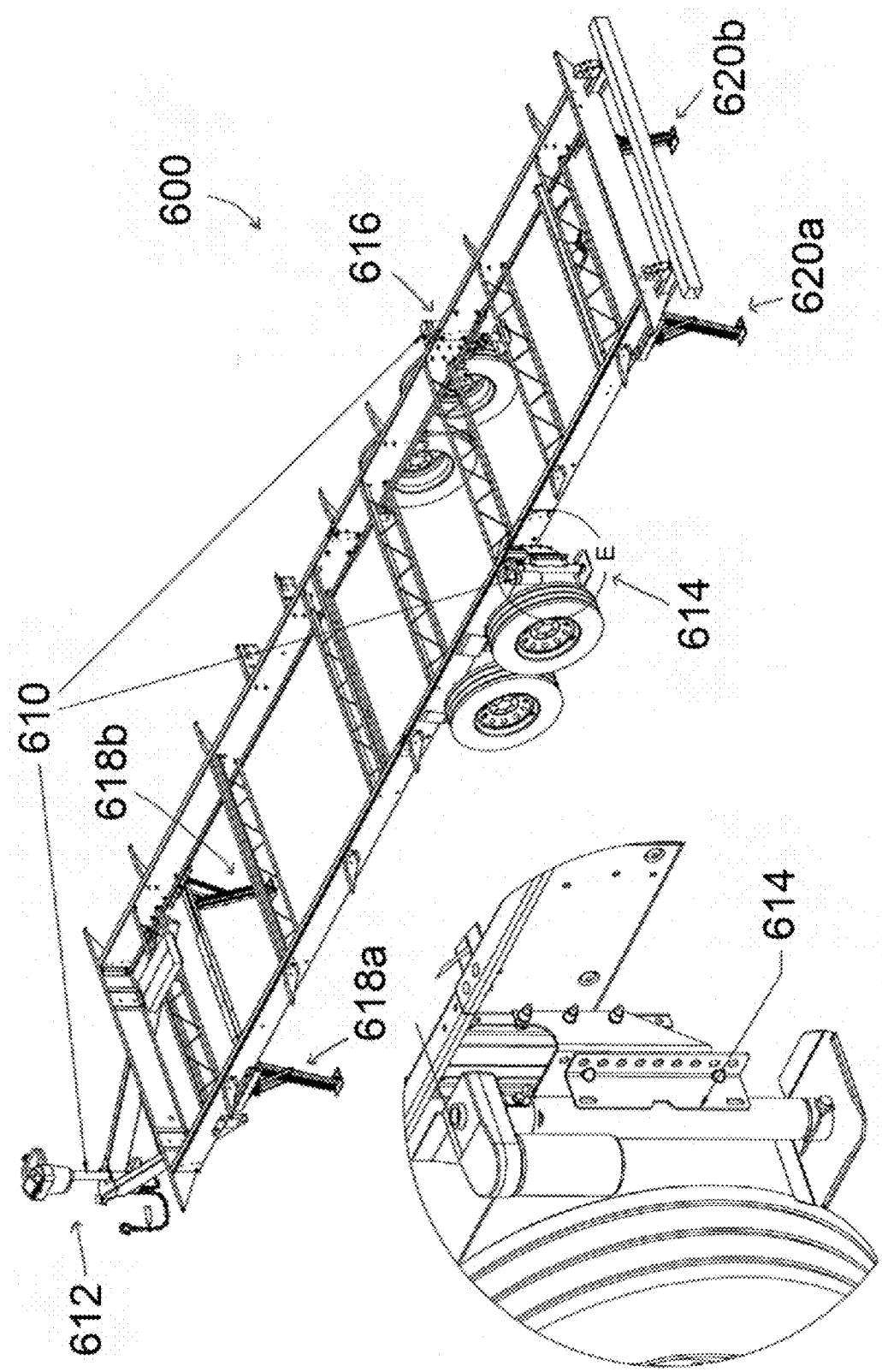
FIGS. 6A-6C illustrate various isometric views of travel trailer frame with an exemplary multi-point leveling system.
Figure 6B:
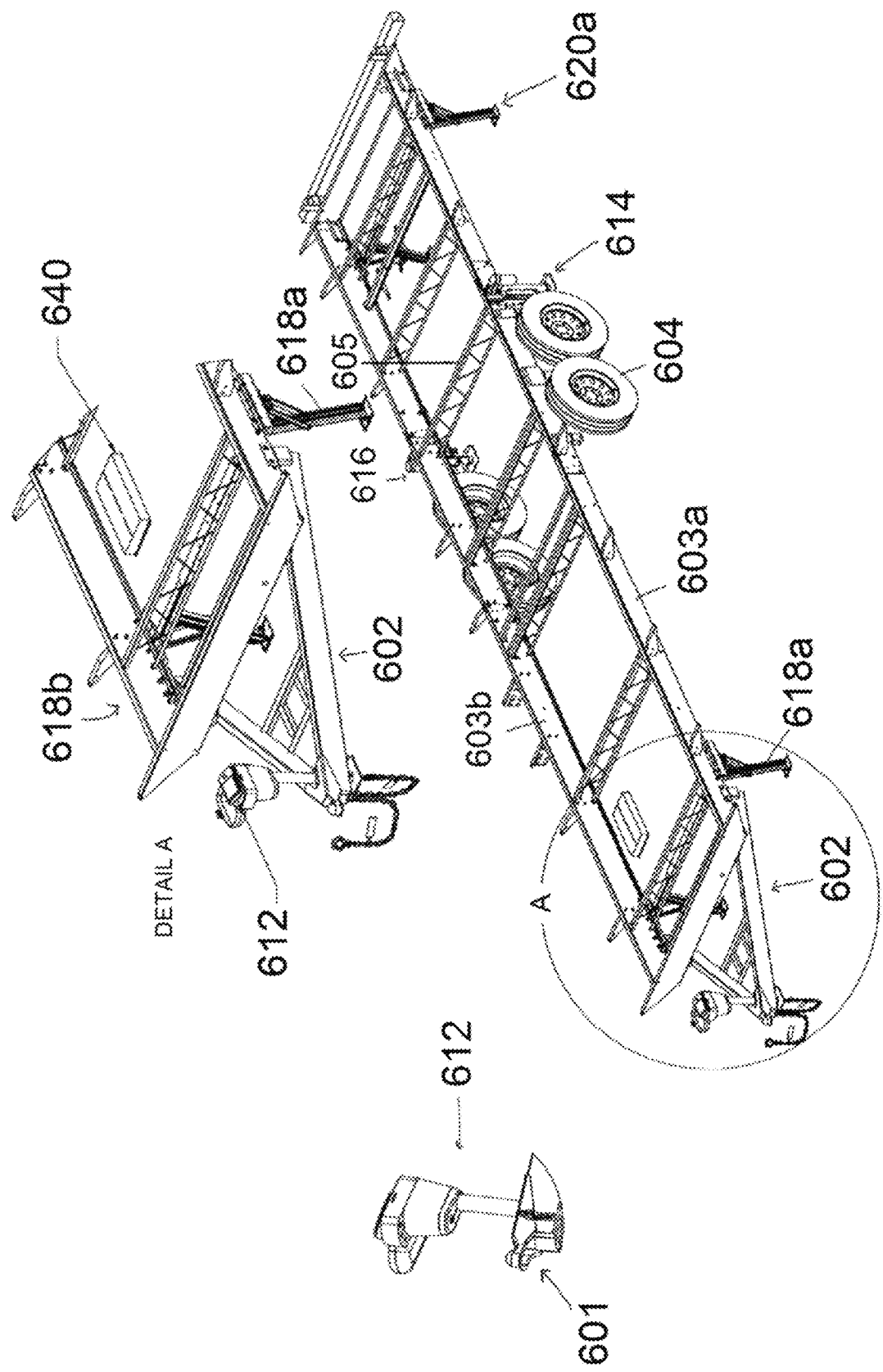
Figure 6C:
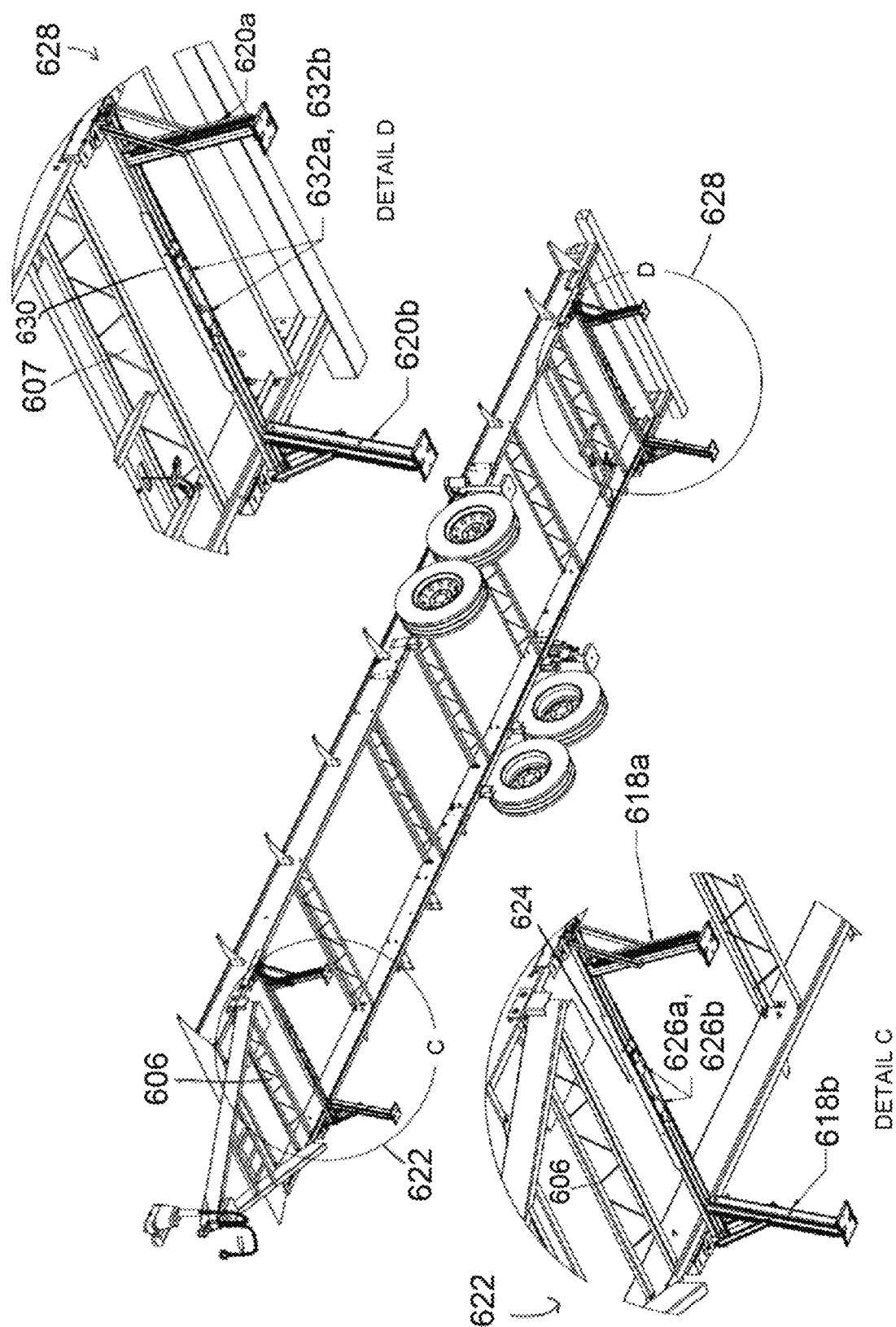

FIGS. 6A-6C depict various isometric views of travel trailer frame 600 having an integrated multipoint leveling system 610 with a plurality of levelers. Here, the leveling system 610 is a three (3) point leveling system and includes a tongue jack 612, a first rear jack 614, a second rear jack 616, and a controller or leveling control system 640. This is a three (3) point leveling configuration, where the tongue jack 612 is the first point, and the first and second rear jacks 614,616 are the second and third points, respectively. The leveling system 610 may also comprise an optional first pair of stabilizers 618a, 618b that offer enhanced stabilization as fourth and fifth points of contact; and may include additional stabilizers or pairs of stabilizers such as an optional second pair of rear stabilizers 620a,620b that further stabilize trailer frame 600 as a sixth and seventh point of contact. While these embodiments depict utilization of rear leveling jacks 614,616, it will be appreciated that the leveling system 610 may instead utilize one or more stabilizers (or one or more pairs of stabilizers) in lieu of leveling jacks 614,616.

The tongue jack 612 is positioned in an easily accessible location towards the front of the travel trailer 600, for example, near the coupler or trailer tongue 601 of the A-Frame 602, as illustrated. The first and second rear jacks 614,616 are located towards the rear of travel trailer 600 and, in the illustrated embodiment, are each mounted on opposing longitudinal frame members 603a,603b at locations behind the axels (not shown) of wheels 604 and near a rear transverse frame member 605. In embodiments utilizing stabilizers in lieu of rear leveling jacks 614,616, such stabilizers may be similarly oriented with respect to the travel trailer.

In some embodiments, the forward most pair of illustrated stabilizers 618a, 618b are part of a front or first stabilization system or assembly 622 (also referred to as stabilizer 622) and, in addition to the pair of stabilizers 618a and 618b, the stabilization system 622 comprises a stabilizer housing 624 and stabilizer motors 626a and 626b housed therein. In this embodiment, front stabilization system 622 is mounted on frame members 603a and 603b at a location behind the A-frame 602 and front transverse frame member 606. Similarly, the optional pair of rear stabilizers 620a and 620b may be provided as part of a rear or second stabilizer system or assembly 628 (also referred to as stabilizer 628) that also comprises a stabilizer housing 630 and stabilizer motors 632a and 632b housed therein. In this embodiment, rear stabilization assembly 628 is mounted on frame members 603a and 603b at a location behind rear transverse frame member 607. In other embodiments, stabilization systems 622,628 are utilized for leveling (and not just for stabilization) so that leveling is achieved utilizing appropriately oriented front stabilization system 622 and/or rear stabilization system 628 instead of or in addition to one or more rear leveling jacks.

Leveling system 610 utilizes leveling control system 640 to govern the operation of and interaction between the foregoing levelers. For example, leveling controller 640 may govern operation of and interaction between leveling jacks (e.g., 612, 614, and 616), the optional front stabilization system 622 and/or the optional rear stabilization system 628. Accordingly, leveling control system 640 has both automatic and manual operation modes and comprises a level sensor (not shown), leveling jack controllers (not shown), and stabilizer controllers (not shown). Leveling control system 640 may also include various relays (not shown) that are integrated with the various stabilizer systems, for example, the front and rear stabilization systems 622,628. The manner in which leveling control system 640 is integrated into leveling system 610 is detailed below. While the level sensor may be any type of sensing device capable of measuring the attitude of a travel trailer frame 600, the illustrated embodiment utilizes a digital accelerometer; however, other sensors may be utilized as detailed above, such as a tilt sensor, which, in one embodiment, is a dual axis tilt sensor manufactured by Spectron Glass & Electronics Inc.

Users may access the leveling system via a user interface that is located at various locations relative to the trailer. For example, the user interface may be integrated into the tongue jack 612 as illustrated in FIGS. 7A-7D. In one embodiment, a user interface 702 is housed within a housing assembly 700. In this embodiment, the user interface 702 is integrated into tongue jack 612 due to its accessibility at the point of interconnect between trailer frame 600 and the tow vehicle (not depicted), especially during mounting and dismounting; however, the user interface 702 may be located elsewhere relative to the structure or trailer, for example, on an exterior side wall compartment or inside the trailer's living compartment.

In the embodiment illustrated in FIG. 7A, the user interface 702 comprises an LED key pad 701 through which the user may manipulate the leveling system 610. In other exemplary embodiments illustrated in FIGS. 7C-7D, the user interface 702 comprises a plurality of inputs such as toggle switches, buttons, and/or indicators that each correspond to a leveler (or groups or pairs of levelers); however, it will be appreciated that the user interface 702 may comprise any number of means by which a user may manipulate the leveling system. For example, each toggle switch may correspond to an individual leveler, or each toggle switch may correspond to a certain grouping of levelers, for example, a pair of stabilizers. In other embodiments, numerous toggle switches are provided, where some of the toggle switches correspond to individual jacks and other toggle switches correspond to predetermined groups of levelers. In these embodiments, the user may individually activate a leveler or group of levelers by pressing its/their corresponding toggle switch or may instead press two or more toggle switches at the same time to simultaneously activate the corresponding levelers or groups of levelers. These toggle switches may each be positionable between an extend or retract position so as to extend or retract a leveler when in such position, or may instead be positionable between and active and non-active position so as to extend or retract when in the active position based on the position of a master switch that may, for example, be positionable between an extend, retract, and off position. Moreover, the user interface 702 may comprise a visual indicator, for example a bubble level that a user may utilize to determine when the structure is level.

Also in this embodiment, the user interface 702 is disposed within housing assembly 700, which comprises a housing 704 and a lid 706 hinged thereto. Latches 708 are provided to secure lid 706 to housing 704. Thus, a user may unlatch and open lid 706 of housing assembly 700 to access the user interface 702 therein and, once finished, may close the lid 706 to protect the user interface 702 electronics from the environment. To this end, lid 706 may be secured to housing 704 via latching mechanism and housing assembly 700 may include a gasket between housing 704 and lid 706 to provide an air tight seal. The housing assembly 700 is therefore weatherproof and prevents the user interface 702 from short-circuiting due to moisture. Further, the housing assembly 700 is lockable to prevent unauthorized access and may, for example, include an integrated locking system or otherwise configured to receive a non-integrated lock such as a pad lock. Moreover, the user interface 702 may include a user programmable security code to inhibit unauthorized access to leveling system 610. This user programmable security code may be utilized in addition to, or in lieu of, the foregoing mechanical locking features.

In the illustrated embodiment, housing assembly 700 comprises integrated work lights that assist a user to utilize leveling system 610 and/or access the trailer tongue 601 for engagement or disengagement of the tow vehicle when there is little or no ambient light, for example, at night. In some embodiments, this light is an LED light; however, any type of light may be utilized. In other embodiments, the light is controlled from the LED key pad 701 (or other user manipulatable means, such as a toggle switch) and may include an automatic deactivation or "shut-off" mode. Further, housing assembly 700 may include an integrated camera system to assist or facilitate a user when aligning the tow vehicle's trailer hitch (not shown) with the trailer tongue 601.

FIG. 8 is a top view of a travel trailer frame 800 having leveling system 610. Here, leveling control system 640 may be centrally located within trailer frame 800, for example, between longitudinal frame members 801 and 802, and between front and rear transverse frame members 803 and 804. However, leveling control system 640 may be located elsewhere, for example, within the tongue jack assembly 612.

FIG. 8 also depicts a manner in which leveling control system 640 is integrated with the levelers, such as the mechanical leveling jacks and stabilizers so as to operate the same, for example, via multiplexing. In operation, a user located near housing assembly 700 of tongue jack 612 may input commands via the user interface 702. These user input command signals are then sent from the user interface 702 to leveling control system 640 via wire 810. The leveling control system 640 then sends a return signal to the tongue jack 612 via power wire 812 and, based upon the attitude of trailer frame 800 as determined by the sensor (not shown) within leveling control system 640, tongue jack 612 is utilized to level frame 800 fore and aft (i.e. the front portion of frame 800 near tongue jack assembly 612 is raised or lowered). The leveling control system 640 then sends signals to the first and second rear jacks 614, 616 so as to activate the same via rear power wires 814 and 816. When activated, the first and second rear jacks 614, 616 "fine tune" the attitude of trailer frame 800 as determined by the sensor (not shown) by leveling trailer frame 800 both the fore and aft and side to side.

Once tongue jack 612 has leveled fore and aft, and once the first and second rear jacks 614, 616 have fine-tuned the attitude of trailer frame 800 in both fore and aft and side to side directions, the leveling control system 640 then sends a "go" signal via the relays therein to the various stabilization systems, for example, the optional front stabilization system 622 and/or the optional rear stabilization system 628. In embodiments having only the front stabilization system 622, leveling control system 640 has two (2) small relays that correspond to stabilizer motors 626a and 626b and communicate via power wires 818 and 820, respectively. Here, leveling control system 640 activates front stabilization system 622 so as to extend stabilizers 618a and 618b to make contact with the ground and provide additional support. Stabilizer motors 626a and 626b are powered simultaneously and drive stabilizers 618a and 618b towards the ground surface, and have mechanical slip clutch assemblies (not shown). The stabilizers 618a and 618b are extended until they make contact with the ground, at which point they will be in a loaded condition and the mechanical slip clutches operate so that stabilizer motors 626a and 626b, while still being powered, are no longer driving and extending stabilizers 618a and 618b. Therefore, in the situation where one stabilizer (e.g. 618a) makes contact with the ground before the other stabilizer (e.g., 618b), the slip clutch within the first motor (e.g., 626a) inhibits any further extension of the first stabilizer (e.g., 618a) so that the second motor (e.g., 626b) can continue driving/extending the second stabilizer (e.g. 618b) until it contacts the ground. The mechanical slip clutch assemblies therefore provide a means for each of the stabilizers of a stabilization system to make a "snug" contact and, permits a stabilizer to "catch up" with the other stabilizer to the extent that one of those stabilizers is lagging behind the other.

In embodiments utilizing the rear stabilization system 628 as well, leveling control system 640 has two (2) additional small relays that correspond to stabilizer motors 632a and 632b and communicate via power wires 822 and 824, respectively. Thus, in this embodiment, leveling control assembly 640 has a total of four (4) small relays. Here, stabilizer motors 632a and 632b also comprise mechanical slip clutches, and leveling control assembly 640 activates rear stabilizer system 628 so as to drive and extend stabilizers 620a and 620b to make contact with the ground in the same manner as described above with respect to front stabilization system 622.

Note that the stabilization system 622,628 may utilize relays and feedback to deactivate in lieu of the foregoing mechanical slip clutches. For example, where stabilization system 622,628 are utilized, stabilizer motor pairs (i.e., 626a/626b and/or 632a/632b) are simultaneously energized, and include feedback sensors to sense amp draw and relays to deactivate the stabilizer motor in response to rapidly increasing amp draw. For example, when a stabilizer foot makes contact with the ground, the amps begin to climb and the feedback sensor reads the rapidly increasing amp draw and shuts down the stabilizer motor.

FIGS. 9A-9C and FIG. 10 depict various isometric views of fifth wheel travel frame 900 having an integral multi-point leveling system 910 that extends and retracts a plurality of levelers to correct the attitude of a structure and, in some embodiments, is a three (3) point leveling system 910. FIGS. 11A-11C and FIG. 12 depict various isometric views of a multi-point leveling system 1110. The primary difference between three (3) point leveling systems 910 and 1110 is that the former utilizes a pair of landing gear as the first point, whereas the latter utilizes a single landing gear as the first point of contact. In both embodiments, the second and third points are first and second rear jacks; however, it will be appreciated that a first and second stabilization system (or a pair of stabilizers) may be utilized instead of the first and second rear jacks. In addition to the first and second rear jacks (or stabilizers in lieu thereof), leveling systems may also comprise a pair of (front or rear) stabilization systems that offer enhanced stabilization to trailer frames 900 and 1100 as fourth and fifth points of contact. Moreover, these leveling systems may optionally include an additional pair of (rear or front) stabilization systems that further stabilize trailer frames 900 and 1100 as sixth and seventh points of contact. These embodiments of leveling systems 910 and 1110 are discussed in turn.

With reference to FIGS. 9A-9C and 10, disclosed is a fifth wheel trailer frame 900 with integrated leveling system 910. Fifth wheel trailer frame 900 comprises opposing longitudinal frame members 903a and 903b, fifth wheel trailer nose 902, wheels 904, front transverse frame member 906, and transverse frame members 905 and 907. The fifth wheel trailer nose 902 further comprises a kingpin 901, a plurality of front vertical supports such as 908a and 908b, a plurality of rear vertical supports such as 909a and 909b, a plurality of cross bars 911a and 911a' (not shown) that interconnect front vertical support 908a and rear vertical support 909a, and a plurality of cross bars 911b and 911b' that interconnect front vertical support 908b and rear vertical support 909b.

In the illustrated embodiment, leveling system 910 is a three (3) point leveling system that comprises a front jack zone 913, a first rear jack 914, a second rear jack 916, and a leveling control assembly 940. Three (3) point leveling system 910 may also comprise a stabilization system 920 having pair of motorized stabilizers 920a and 920b. In this embodiment, front jack zone 913 comprises landing gear 912a and 912b, which are each vertically mounted on cross bars 911a and 911a' and 911b and 911b', respectively. The first and second rear jacks 914, 916 are located towards the rear of travel trailer 900 and, in the illustrated embodiment, are each mounted on opposing longitudinal frame members 903a, 903b at locations behind the axles (not shown) of wheels 904 and near a rear transverse frame member 905.

The pair of stabilizers 920a and 920b are part of stabilization system 928 that also comprises a stabilizer housing 930 and stabilizer motors 932a and 932b housed therein. In this embodiment, stabilizer system 928 is mounted on frame members 903a and 903b at a location behind transverse frame member 907; however, it will be appreciated that stabilization system 928 may be mounted elsewhere on fifth wheel trailer frame 900 and, in some embodiments one or more additional stabilization systems may be utilized as discussed below.

The leveling system 910 utilizes leveling control system 940 to govern the operation of and interaction between the foregoing leveling jacks (e.g., 912a, 912b, 914, and 916), as well as any optional stabilization systems such as stabilizer 928. The leveling control assembly 940 is similar to that described above with regard to the three (3) point leveling system 610. Thus, leveling control system 940 has both automatic and manual operation modes and comprises a level sensor (not shown), leveling jack controllers (not shown), and stabilization system controllers (not shown). While the level sensor may be any type of sensing device capable of measuring the attitude of a fifth wheel trailer frame 900, the illustrated embodiment utilizes a digital accelerometer; however, other sensors may be utilized such as a tilt sensor, for example, a dual axis tilt sensor such as that manufactured by Spectron. In embodiments utilizing stabilization system, such as stabilizer 928, leveling control system 940 may include integrated relays (not shown) that trigger actuation of the motorized stabilizers (if any) once the leveling jacks (i.e., 912a, 912b, 914, and 916) have finished leveling the fifth wheel trailer frame 900. In other embodiments, the user may manually trigger the actuation of one or both stabilizers in the stabilization system as part of the leveling process; however, in other embodiments, the user may manually trigger each stabilizer of a pair of stabilizers independently of the other stabilizer as part of the leveling process.

A user may access and operate the leveling system 910 via leveling control touch pad 960, which is similar to the LED key pad 701 or toggle switches of user interface 702 detailed above; however, leveling control touch pad 960 is located on an external panel (not shown) of the fifth wheel trailer (not shown). In one embodiment, leveling control touch pad 960 is located on the driver side of and near the front of the fifth wheel trailer. In this embodiment, leveling control touch pad 960 may include a lockable cover (not shown) so as to inhibit unauthorized access. Alternatively, leveling control touch pad 960 may be located at other location on the exterior of the fifth wheel trailer or within the cabin.

Figure 10:
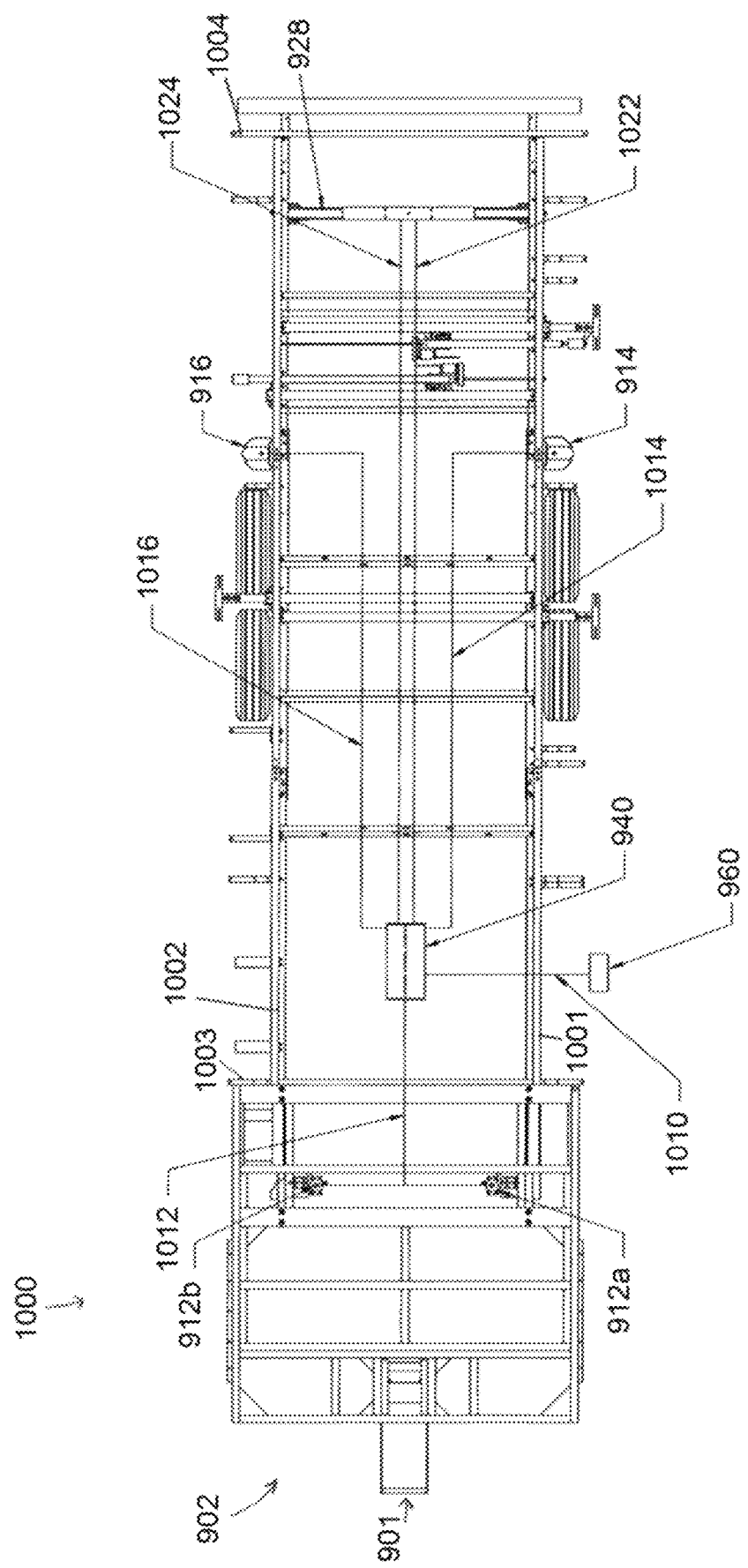
FIG. 10 is a top view of the fifth wheel trailer frame and multi-point leveling system of FIGS. 9A-9C.
Figure 11A:
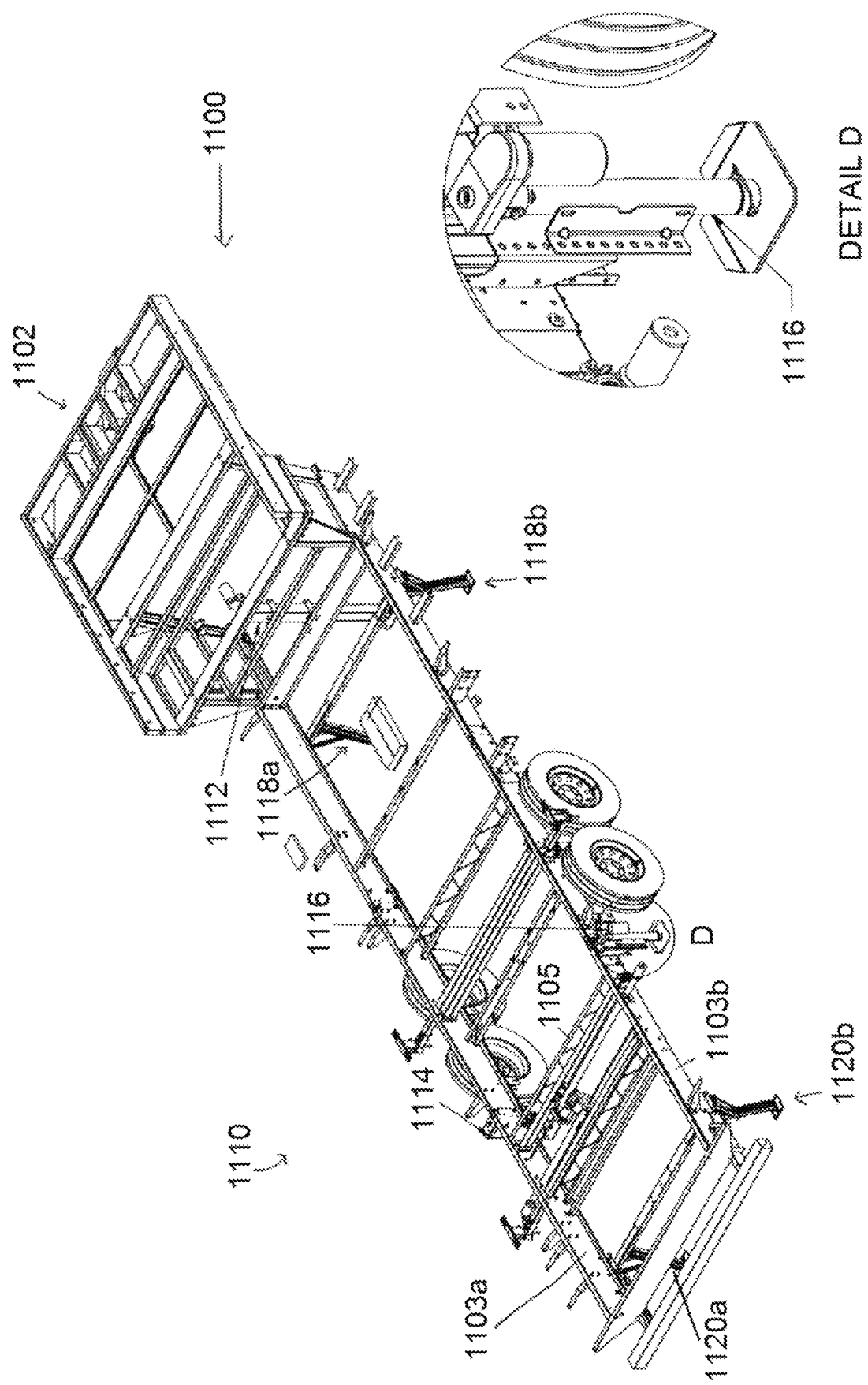
FIGS. 11A-11C are various isometric views of a fifth wheel trailer frame with another exemplary multi-point leveling system.
Figure 11B:
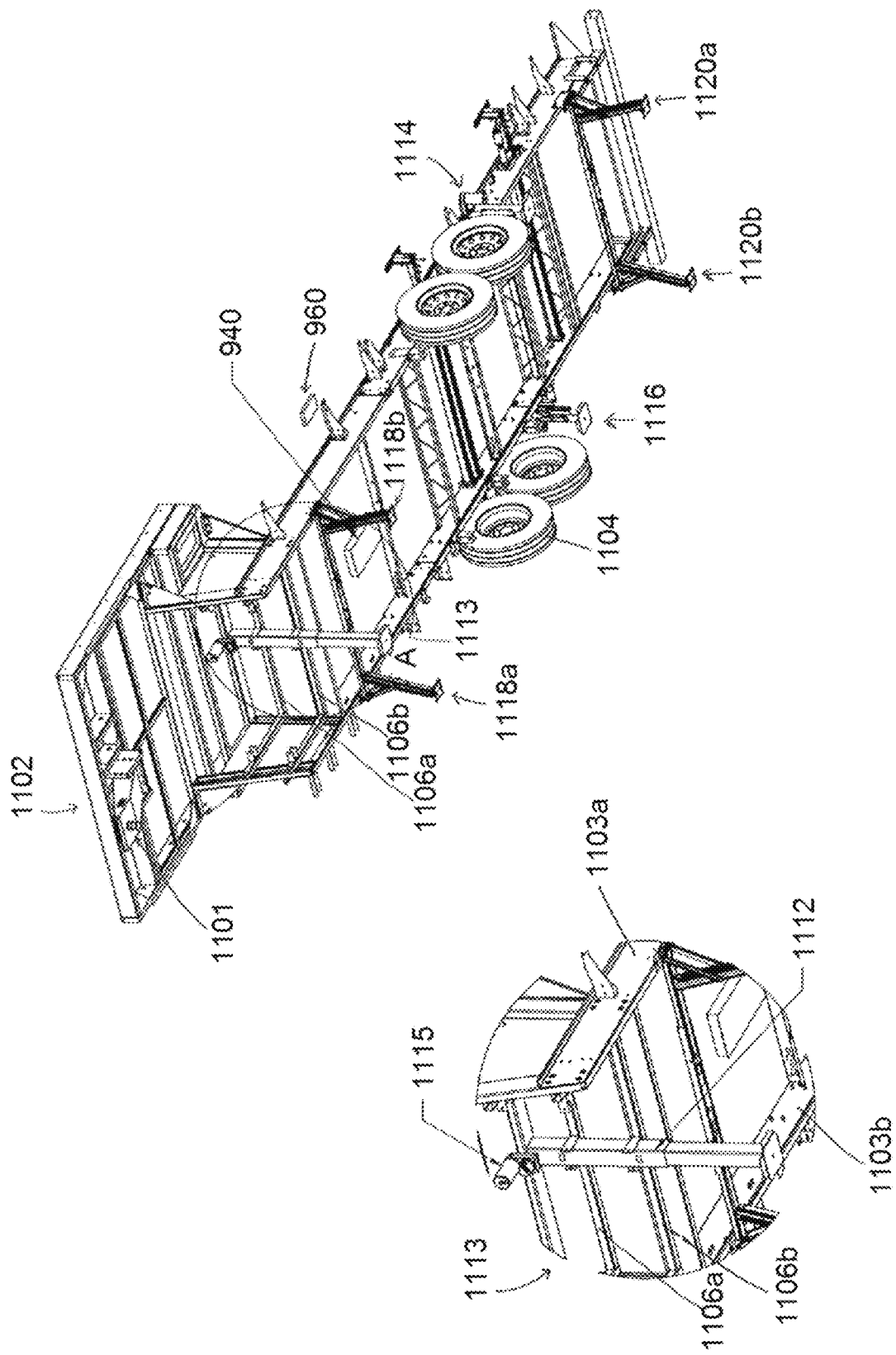
Figure 11C:
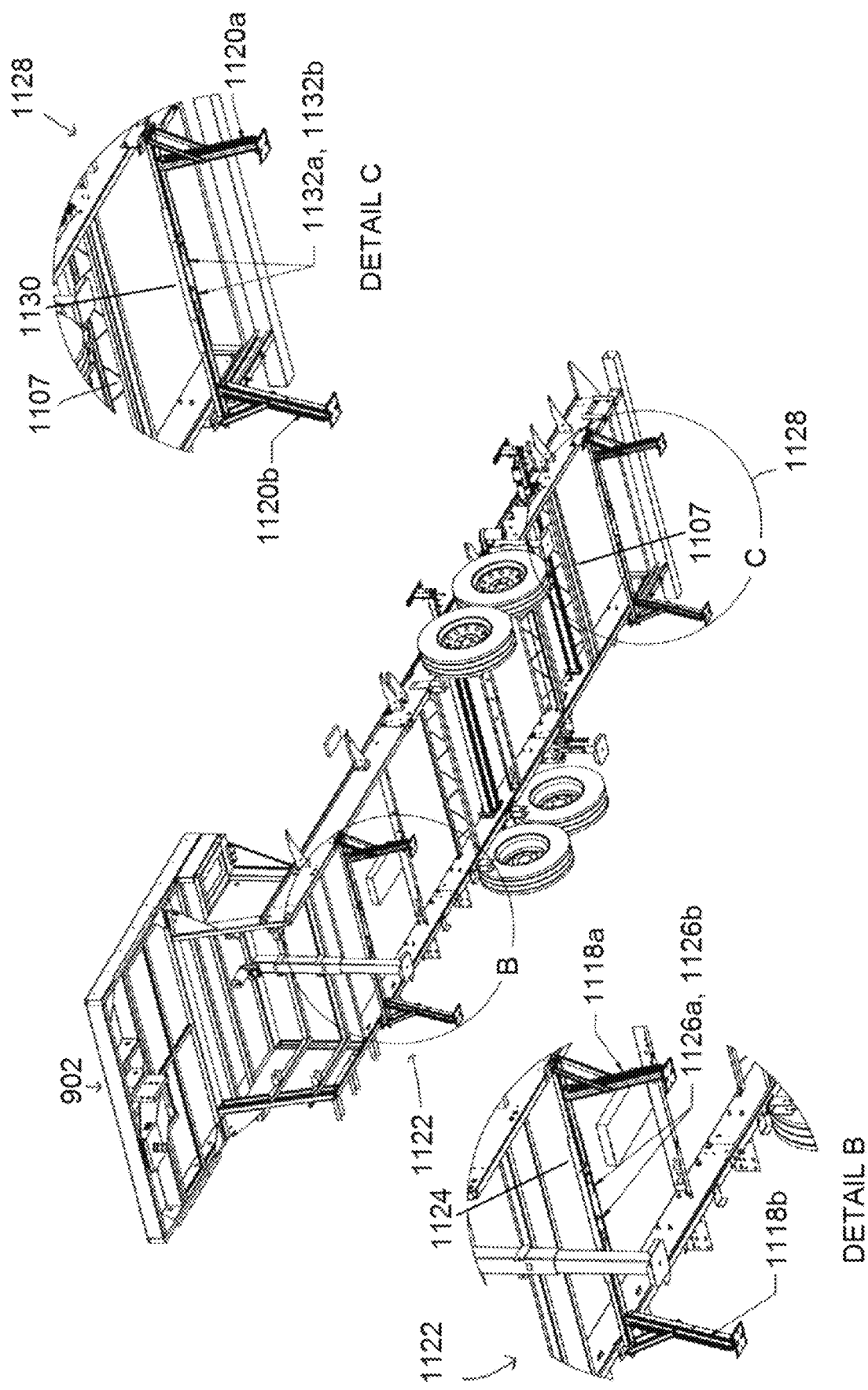
Figure 12:
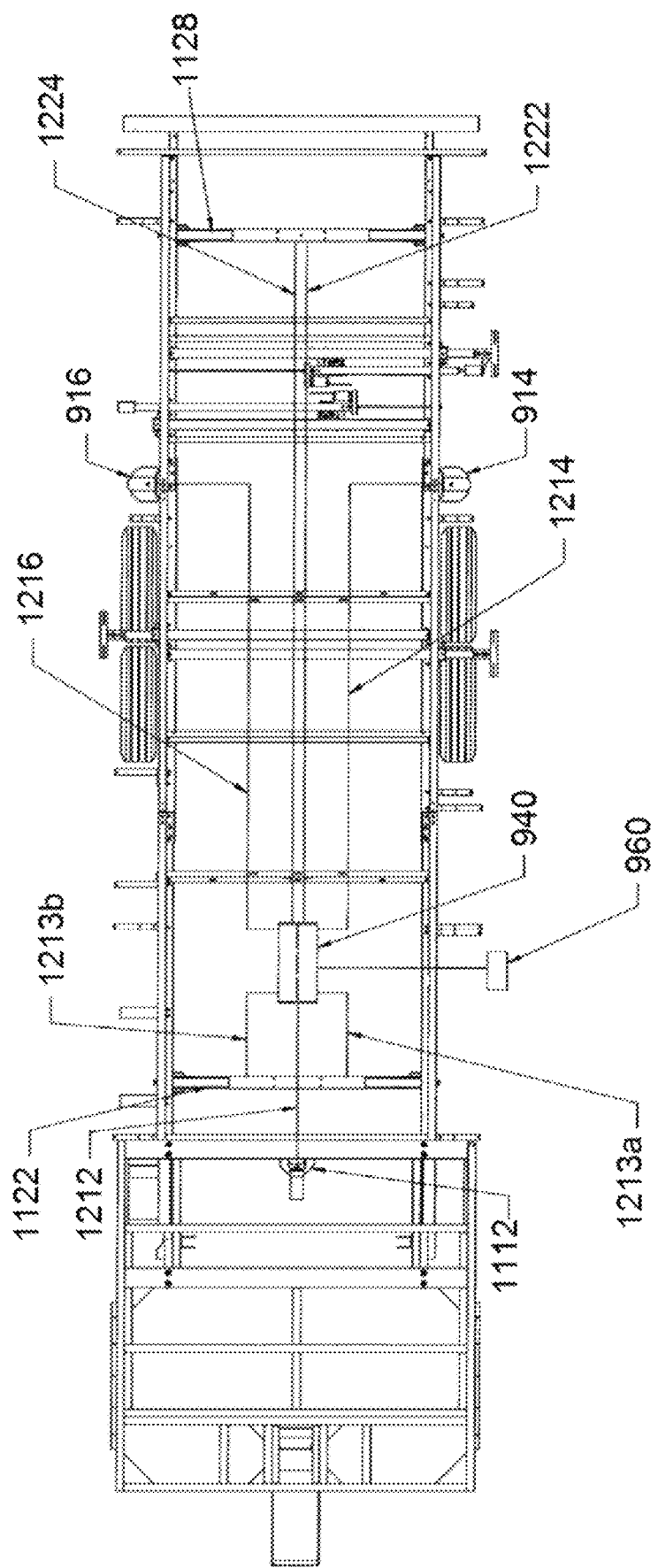
FIG. 12 is a top view of the fifth wheel trailer frame and multi-point leveling system of FIGS. 11A-11C.

FIG. 10 is a top view of a fifth wheel trailer frame 1000 having leveling system 910. Here, leveling controller 940 may be centrally located within trailer frame 1000, for example, between longitudinal frame members 1001 and 1002, and between front and rear transverse frame members 1003 and 1004. However, leveling controller 940 may be located elsewhere, for example, within the fifth wheel trailer nose 902.

FIG. 10 also depicts a manner in which leveling controller 940 is integrated with the various levelers such as the mechanical leveling jacks and stabilization systems. In operation, a user will input commands via the leveling control touch pad 960, and these user input command signals are thereafter sent from the leveling control touch pad 960 to leveling controller 940 via wire 1010. The leveling controller 940 then sends a return signal to the front jack zone 913 via power wire 1012.

The leveling controller 940 may send a single signal via power wire 1012 to front jack zone 913, which is split to landing gear 912a and 912b so that they are simultaneously powered. Together, landing gear 912a and 912b constitute a single point (or zone) in the three (3) point leveling system 910, and are therefore collectively referred to as the front jack zone 913. Depending on the attitude of trailer frame 1000 as determined by the sensor (not shown), the leveling controller 940 sends a single signal to front jack zone 913 causing landing gear motors 915a and 915b to extend landing gear 912a and 912b, thereby leveling fifth wheel trailer frame 1000, both fore and aft and side to side.

In the illustrated embodiments, landing gear motors 915a and 915b each include a mechanical slip clutch. Thus, landing gear motor 915a will cease extending landing gear 912a when it hits the ground. Similarly, landing gear motor 915b will cease extending landing gear 912b when it hits the ground. As described above with respect to stabilization system 622 and 628, the landing gear that first makes contact with the surface stops extending, which allows the other landing gear that has not yet contacted the surface to "catch up," thereby ensuring an even leveling. In other embodiments, landing gear motors 915a and 915b may utilize feedback to sense amp draw such that when the surface pad of either landing gear 912a and 912b makes contact with the ground, the amps begin to climb, the sensors in landing gear motors 915a and 915b read the rapidly increasing amp draw, and shut down power to the respective landing gear motor in response to the increased amps.

After landing gear 912a and 912b have extended and leveled fifth wheel trailer frame 1000, the leveling controller 940 sends signals to the motors that power the first and second rear jacks 914, 916 so as to energize the same via rear power wires 1014 and 1016, respectively. When energized, the first and second rear jacks 914, 916 "fine tune" the attitude of fifth wheel trailer frame 1000 as determined by the level sensor (not shown) by leveling trailer frame 1000 both the fore and aft and side to side, as determined by the level sensor. In fifth wheel trailer embodiments not utilizing any stabilization system, the process is over and fifth wheel trailer frame 1000 is leveled.

Alternatively, the first and second rear jacks 914 and 916 may "fine tune" the attitude of the fifth wheel trailer frame 100 utilizing relays and feedback instead of the level sensor. For example, the first and second rear jack motors 1015 and 1017 may each have a relay and feedback sensor. Here, motors 1015 and 1017 independently utilize feedback to sense amp draw. When the jack foot of either first or second rear jack 1014 or 1016 makes contact with the ground, the amps begin to climb, the sensors in rear jack motors 1015 and 1017 read the rapidly increasing amp draw, and shut down power to the respective jack motor in response thereto. Again, in fifth wheel trailer embodiments not utilizing any stabilizer systems, the process is over and fifth wheel trailer frame 1000 is leveled.

There is at least a next step to the leveling process, however, in embodiments utilizing one or more stabilization system (e.g., stabilizer 928). For example, once the front jack zone 913 has leveled fore and aft and side to side via extension of landing gear 912a and 912b, and once the first and second rear jacks 914, 916 have "fine-tuned" the attitude of trailer frame 1000 in both fore and aft and side to side directions, leveling control assembly 940 then sends a "go" signal via the relays therein to the various stabilization systems, for example, optional stabilizer 928, which may be located at various locations with respect to trailer frame 1000. In other embodiments, a second stabilization system (not shown) is utilized and, in even other embodiments, more than two (2) stabilization systems may be utilized.

In embodiments having only one stabilization system (e.g., stabilizer 928), leveling controller 940 has two (2) small relays that correspond to stabilizer motors 932a and 932b and communicate via power wires 1022 and 1024, respectively. Here, stabilizer motors 932a and 932b may each have a relay and feedback sensor, such that motors 932a and 932b independently utilize feedback to sense amp draw. When the foot of either of the stabilizers 920a and 920b makes contact with the ground, the amps sensed in the respective stabilizer motor (i.e., 932a or 932b) begin to climb, and the sensors therein read that rapidly increasing amp draw and shut down power to the respective stabilizer motor in response thereto.

Alternatively, any and all stabilization systems (i.e., stabilizer 928) may incorporate mechanical slip clutches to deactivate stabilizer extension when "level" as detailed above. Here, stabilizer motors 932a and 932b are powered simultaneously and drive stabilizers 920a and 920b towards the ground surface, and have mechanical slip clutches (not shown). The stabilizers 920a and 920b are extended until they make contact with the ground, at which point they will be in a loaded condition and the mechanical slip clutches operate such that stabilizer motors 932a and 932b remain powered, but are no longer driving and extending stabilizers 920a and 920b. Therefore, in the situation where one stabilizer (e.g. 920a) makes contact with the ground before the other stabilizer (e.g., 920b), the slip clutch within the first motor (e.g., 932a) inhibits any further extension of the first stabilizer (e.g., 920a) so that the second motor (e.g., 932b) will continue driving/extending the second stabilizer (e.g. 920b) until it contacts the ground. As detailed above, the mechanical slip clutches thus provide a means for each of the stabilizers to make a "snug" contact and, permits a first stabilizer to "catch up" with its paired second stabilizer to the extent that the first stabilizer is lagging behind the other.

It will be appreciated that one or more additional stabilization systems, in addition to stabilization 928, may be utilized. In these embodiments utilizing additional stabilization systems, leveling controller 940 will have two (2) additional relays for each additional stabilization system. Here, each additional pair of relays corresponds with the pair of stabilizer motors in each additional stabilization system. Moreover, each additional stabilizer motor will comprise either (i) the relay and feedback sensor to deactivate in response to increased amp draw or (ii) a mechanical slip clutch so that the stabilizers cease extending once in contact with the surface as more fully described above. Furthermore, it will be appreciated that stabilization system embodiments may utilize either or both of (i) the relay and feedback sensor and (ii) a mechanical slip clutch.

In an alternate embodiment of the above, the landing gear 912a and 912b are synchronized with the first and second rear jacks 914 and 916. Here, a user would manually extend the landing gear 912a and 912b and then switch to an automatic mode. In the automatic mode, the landing gear 912a and 912b are synchronized with the first and second rear jacks 914 and 916, so that landing gear 912a and rear jack 914 extend and retract together, and so that landing gear 912b and rear jack 916 extend and retract together. In this embodiment, the controller 940 would include an extra pair of relays. This mode ensures that the trailer frame is not twisted.

FIGS. 11A-11C and FIG. 12 depict various isometric views of fifth wheel trailer frame 1100 fitted with an alternate embodiment of the leveling system 1110, which in some configurations is a three (3) point leveling system having a landing gear jack 1112, first and second rear jacks 1114 and 1116, and leveling controller 940. The leveling controller 940 is identical to that described above, and may also include the same leveling control touch pad 960 that is similarly interconnected as described above. In other embodiments, this leveling system incorporates one or more stabilization systems instead of leveling jacks such as first and second rear jacks 1114, 1116.

This leveling system 1110 may also comprise front and rear stabilization systems 1122 and 1128. Therefore, this three (3) point leveling system 1110 has two (2) distinct differences from that described in FIGS. 9A-9C and FIG. 10, but is otherwise identical in structure and operation. The first difference is that leveling system 1110 utilizes a single landing gear jack 1112 that is powered by landing gear motor 1115 instead of utilizing front jack zone 913 with a pair of landing gear (i.e., 912a and 912b). Second, leveling system 1110 utilizes two stabilization systems, a front stabilization system 1122 and a rear stabilization system 1128. Again, it will be appreciated that variations of this embodiment are contemplated that utilize zero (0), one (1), or more than two (2) stabilizer systems. And, moreover, it will be appreciated that variations of this embodiment are contemplated that utilize one or more modified stabilization systems having a single motorized stabilizer (rather than a pair of stabilizers) instead of the rear leveling jacks.

In this embodiment, landing gear jack 1112 and motor 1115 are vertically mounted to one or more front transverse frame members, for example members 1106a and 1106b that comprise part of the fifth wheel nose assembly 1102. Landing gear motor 115 is connected to leveling control assembly 940 via power wire 1212. The first and second rear jacks 1114 and 1116 are located towards the rear of fifth wheel trailer frame 1100 and, in the illustrated embodiment, are each mounted on opposing longitudinal frame members 1103a, 1103b at locations behind the axels (not shown) of wheels 1104 and near a rear transverse frame member 1105. Moreover, first and second rear jacks 1114 and 1116 are connected to leveling controller 940 via power wires 1214 and 1216, respectively.

This embodiment also includes a front stabilization system 1122, which comprises stabilizers 1118a and 1118b that are driven by stabilizer drive assembly 1124 having motors 1126a and 1126b. Stabilizer motors 1126a and 1126b are connected to leveling controller 940 via power wires 1213a and 1213b, respectively. This embodiment also includes a rear stabilization system 1128, which comprises stabilizers 1120a and 1120b that are driven by stabilizer drive assembly 1130 having motors 1132a and 1132b. Stabilizer motors 1132a and 1132b are connected to leveling controller 940 via power wires 1222 and 1224, respectively. The foregoing front and rear stabilization systems 1122 and 1128 each utilize independent relays and feedback sensors so as to cease operation in response to increased current draw as described above; however, these stabilization systems 1122 and 1128 may instead utilize mechanical slip clutches as detailed above, or, alternatively, utilize both (i) the relay and feedback sensor and (ii) a mechanical slip clutch.

Figure 13A:
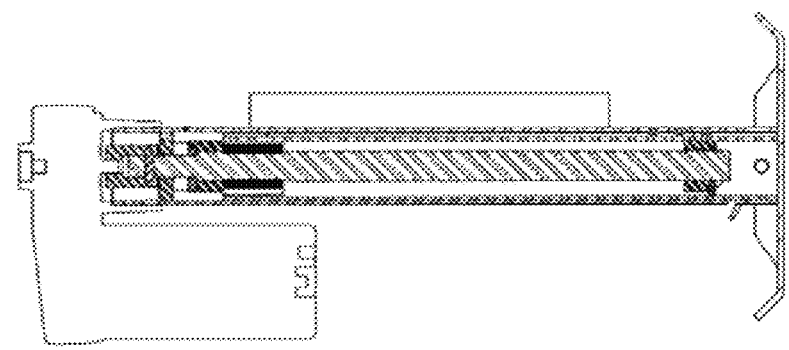
FIGS. 13A & 13B are various views of an exemplary leveling jack in the extended and retracted position, which may be utilized in the various multi-point leveling systems disclosed herein.
Figure 13A:
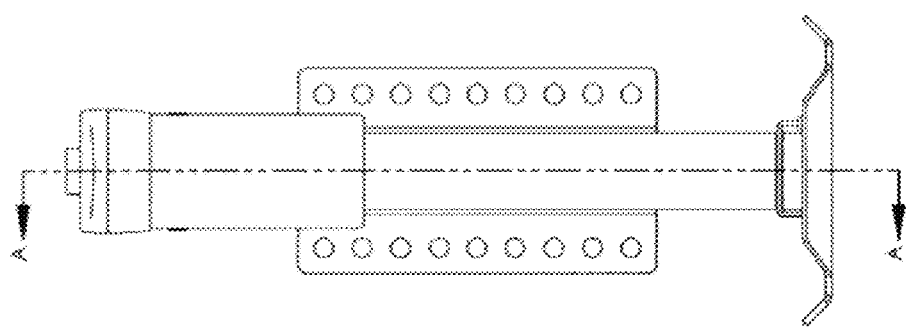
Figure 13B:
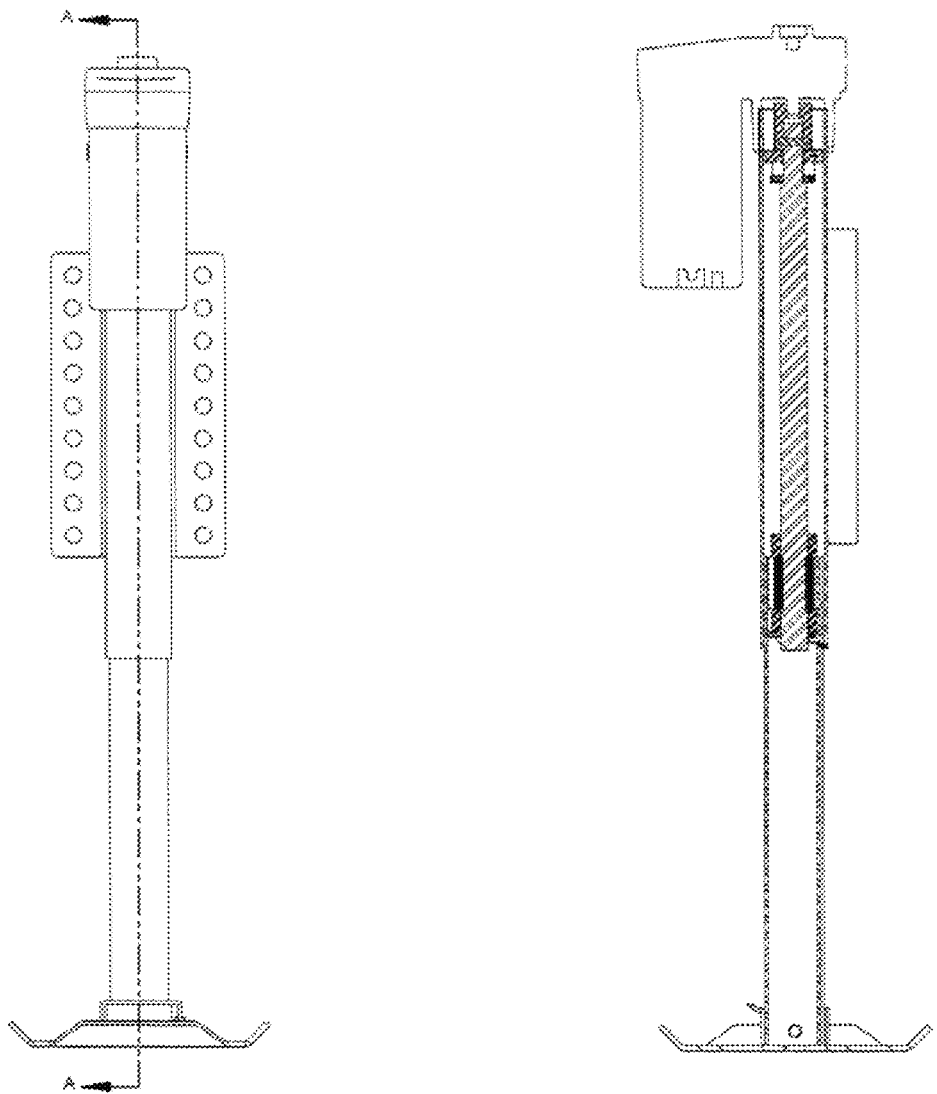
Figure 14A:
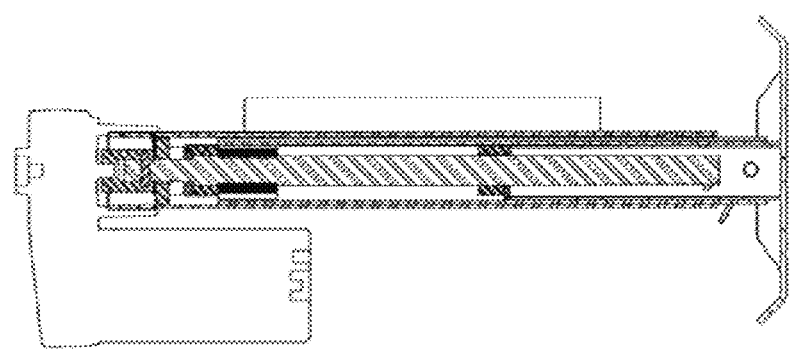
FIGS. 14A & 14B are various views of another exemplary leveling jack in the extended and retracted position, which may be utilized in the various multi-point leveling systems disclosed herein.
Figure 14A:
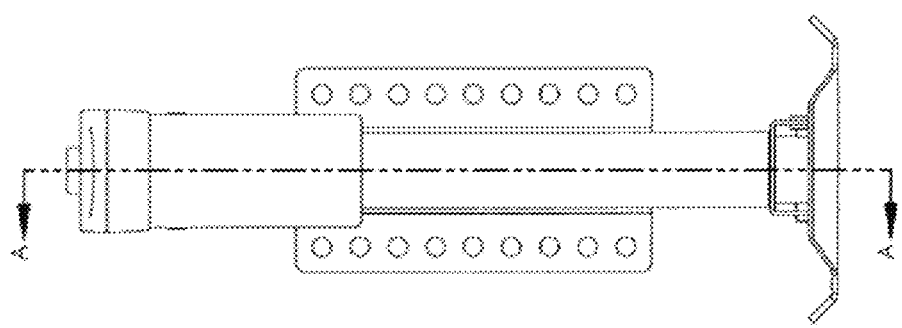
Figure 14B:
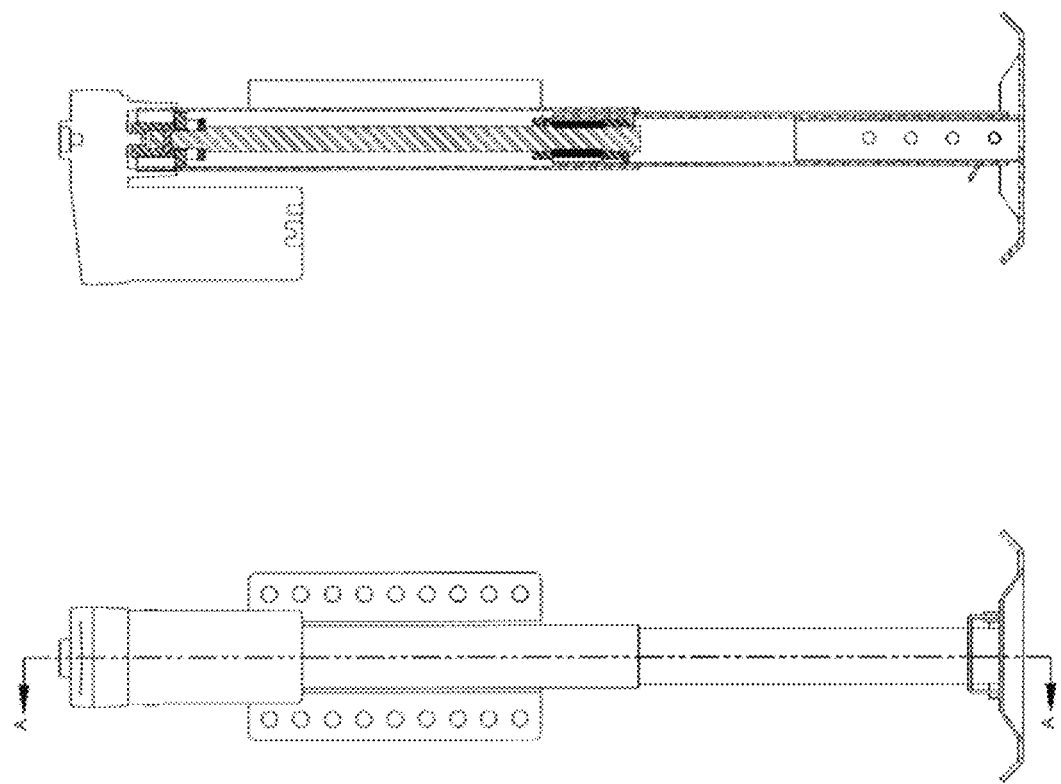
Figure 15A:
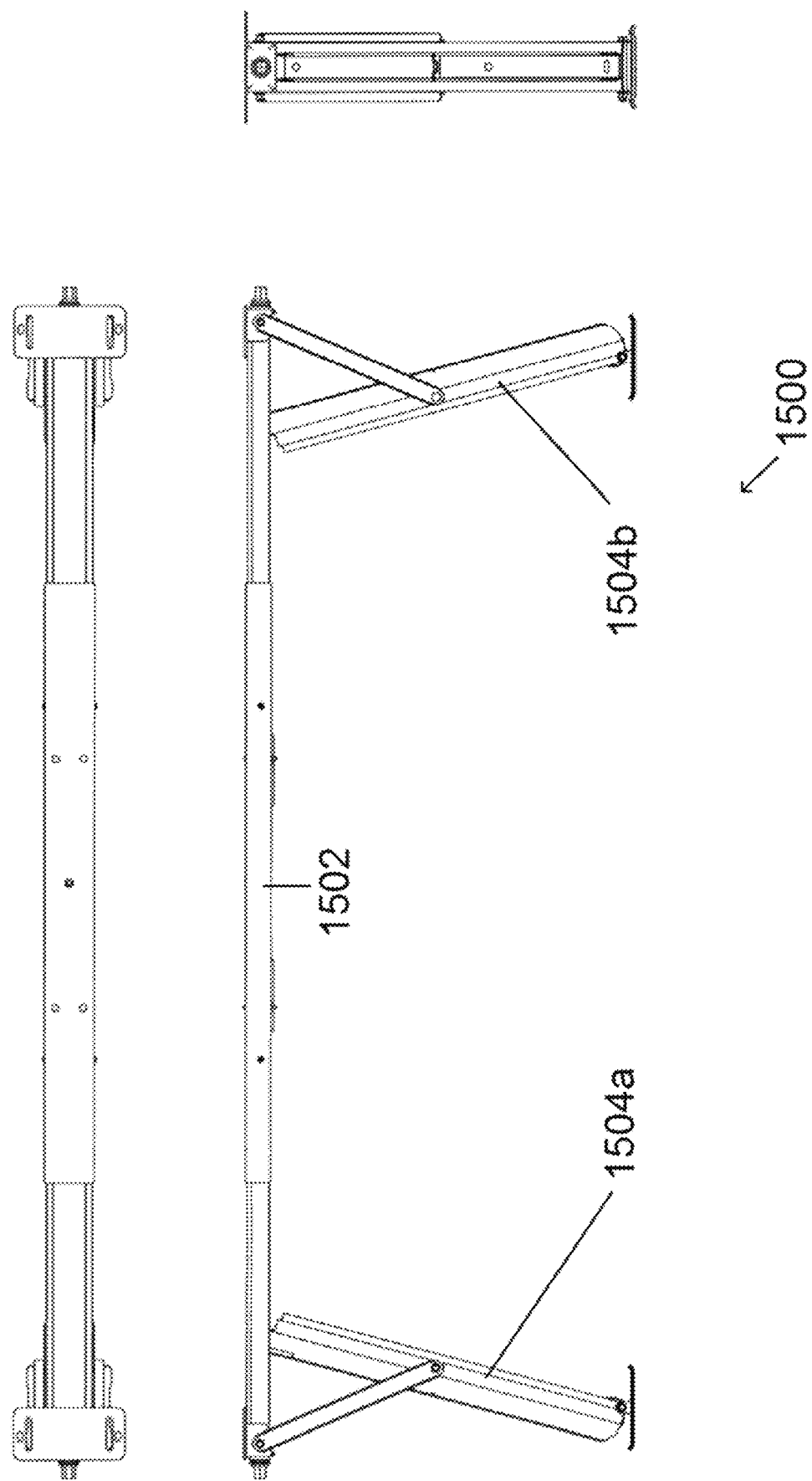
FIGS. 15A-15E are various views of an exemplary stabilizer jack system in extended and retracted positions, which may be utilized in the various multi-point leveling systems disclosed herein.
Figure 15B:
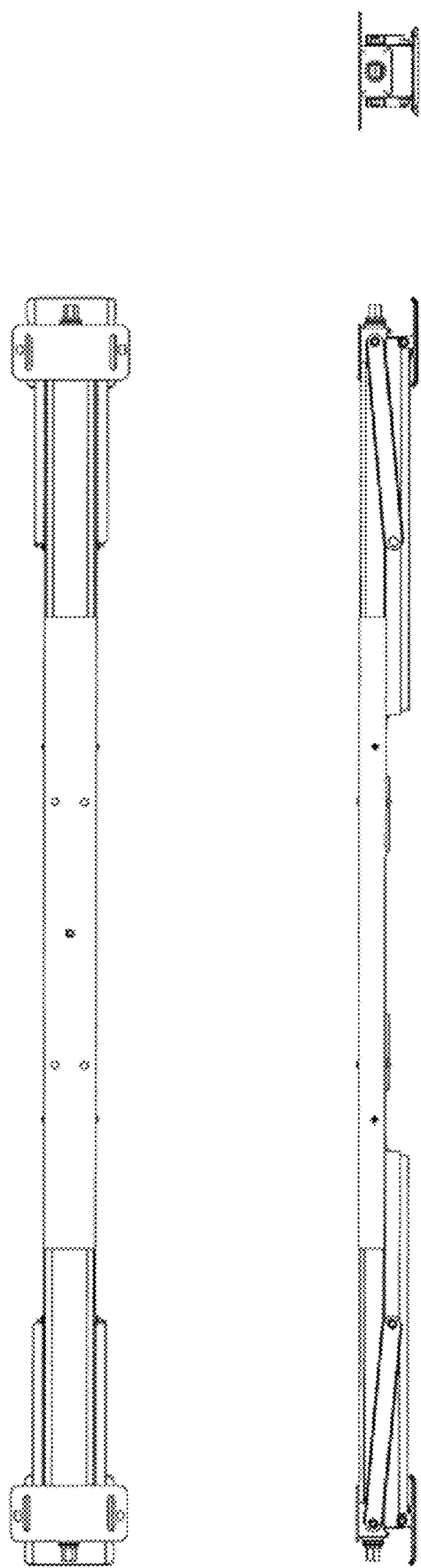
Figure 15C:
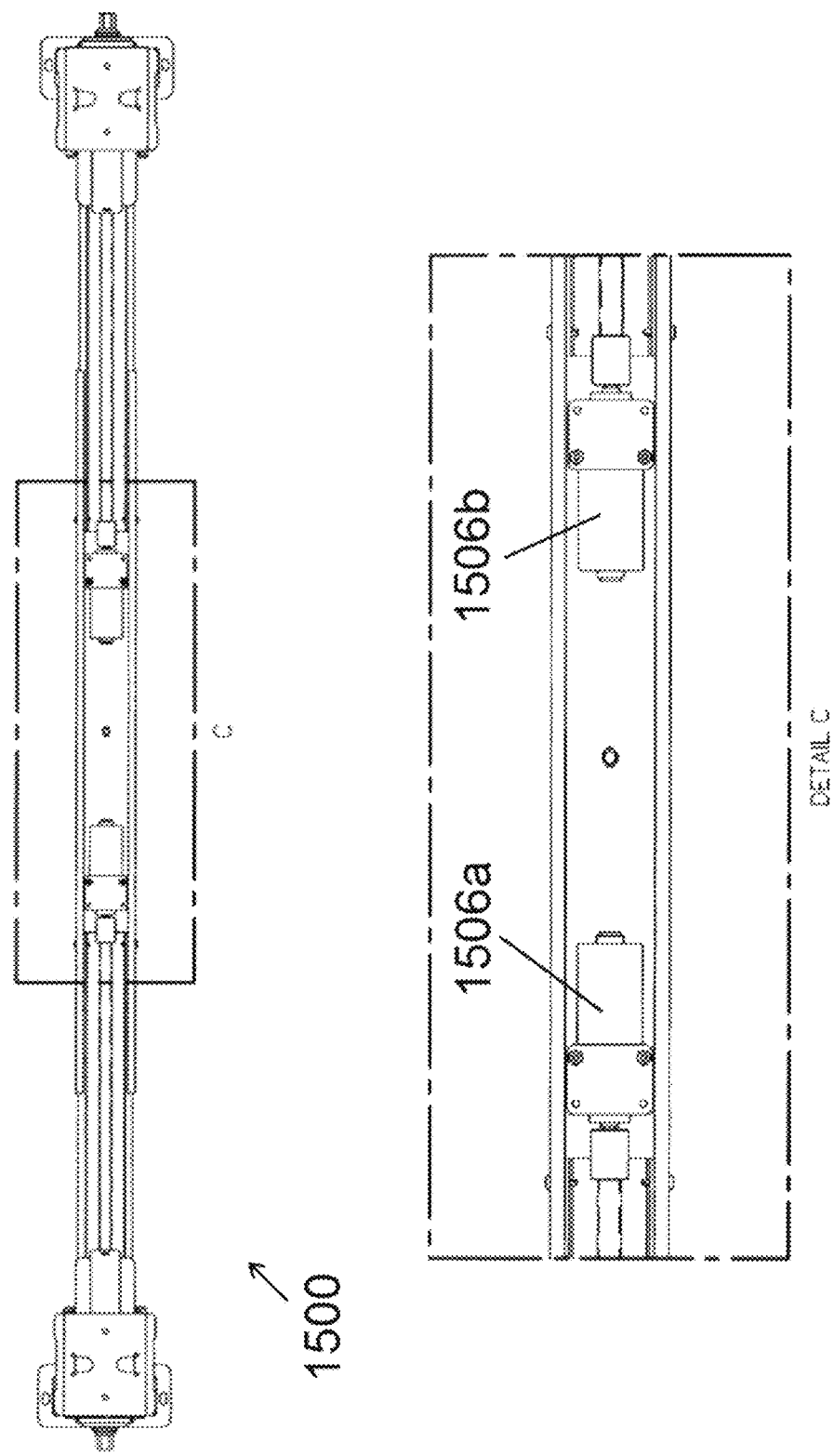
Figure 15D:
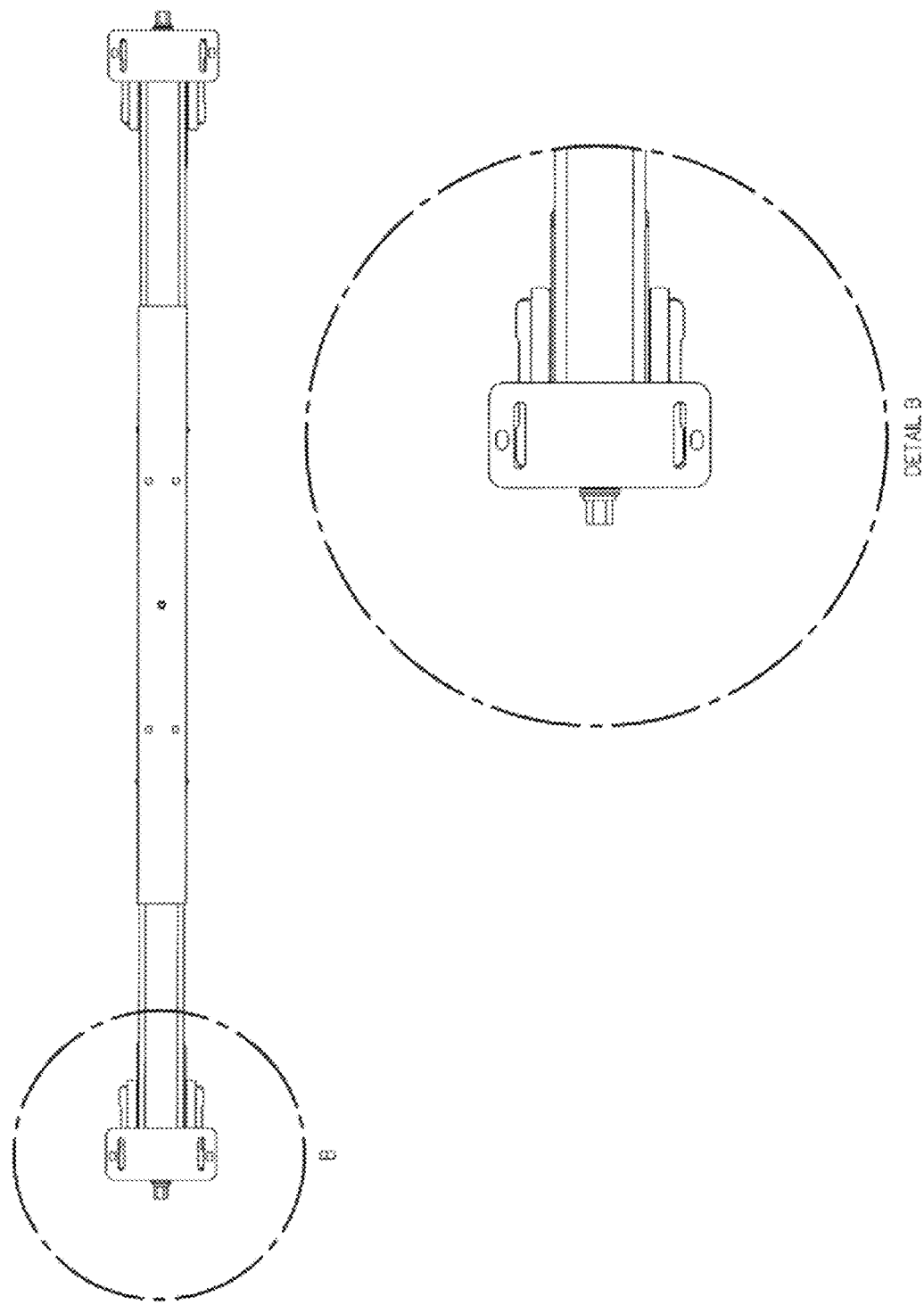
Figure 15E:
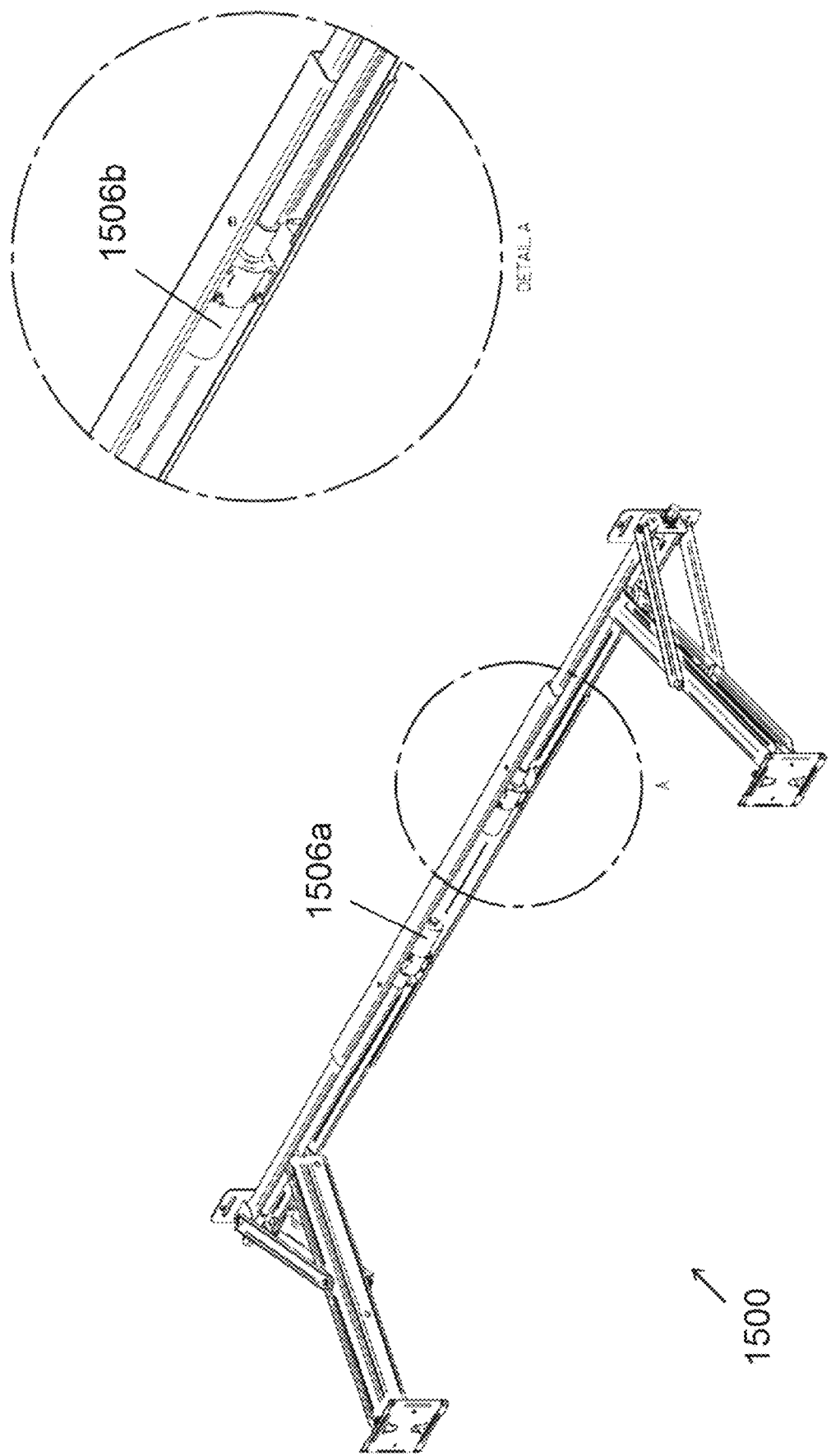

FIGS. 13A-13B depict an exemplary embodiment of a leveler that may be utilized with the systems disclosed herein. More specifically, FIGS. 13A-13B illustrate an exemplary leveling jack in retracted and extended positions that may be utilized as any or all of the tongue jack and the first and second rear jacks. In this embodiment, the leveling jacks utilize a standard shoe. FIGS. 14A-14B depict a different embodiment of those same leveling jacks in the extended and retracted position, respectively, but utilizing a drop tube shoe in lieu of the standard shoe. Both embodiments utilize one or more soft stop bumpers, for example a retraction soft stop bumper and a extension soft stop bumper. These soft stop bumpers are compressed when the jack is fully extended or retracted, and permit the slow build up current (i.e., amps) that trigger the shut-off condition. These soft stop bumpers therefore prevent the jack motors from overheating and failing by ensuring the motor isn't trying to further extend or retract the jack legs when in fully extended or retracted position.

FIGS. 15A-15E depict an exemplary leveler that may be utilized with the systems detailed herein, and which are well known in the art. More specifically, these figures illustrate an example embodiment of the stabilization systems. In this embodiment, each stabilization system 1500 includes a housing 1502 and a pair of stabilizers 1504a,b (also referred to as stabilizer legs 1504) configured to extend or retract therefrom via a pair of respective motors 1506a,b that are disposed within a channel of the housing 1502. This exemplary configuration facilitates cross rail installation of the stabilization system 1500 under the trailer frame. Here, the motor may be mounted on the back side of the stabilizer jack so that it does not interfere with a user's ability to hand crank the stabilizer jack when power is not available. Moreover, the position of the motor along with the retracted height of the stabilizer improves the ground clearance of the stabilizer jack when towing and reduces the incidents of unintended detachment of the stabilizer jacks from the trailer. It will be appreciated, however, that each stabilizer leg and its respective motor may instead be assembled and mounted independent of the housing and/or channel where the mounting location has an inboard location to fasten the back side of the stabilizer jack. It will also be appreciated that each stabilization system may be provided in pairs meaning each such system comprises a pair of stabilizers (or a pair of stabilizer legs), but in other embodiments, stabilization systems may be provided individually meaning a stabilization system has a single motor driven stabilizer (or stabilizer leg). Nevertheless, such stabilization jack assemblies are well known in the art The slip coupler moves back and forth on both the drive motor output shaft and the end of the stabilizer jacks' drive screws without letting either "bottom-out" or exit the coupler. This prevents the load of the stabilizer jack from overloading the gears in the drive motor, thereby insuring prolonged life of the gear train and a properly functioning power stabilizer jack.

The universal mounting bracket covers the widest range of mounting positions on various frame widths.

Figure 16A:
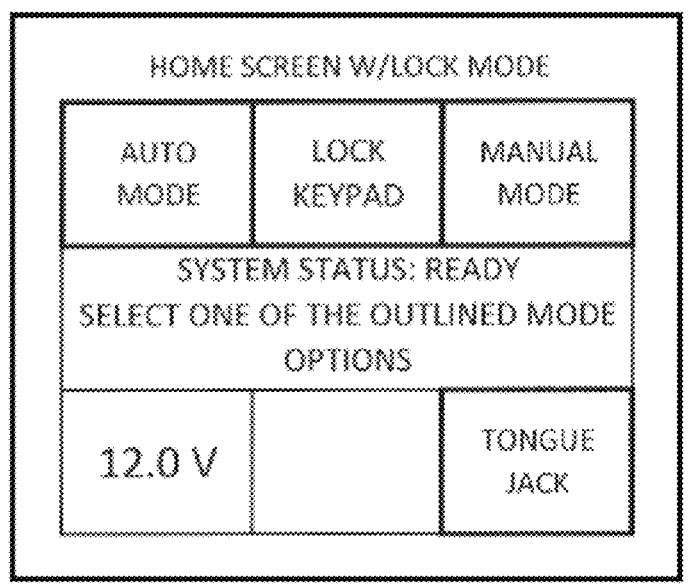
FIGS. 16A-U include various illustrations of an exemplary user interface for a leveling system, and further illustrate exemplary functions that may be pre-programmed into the leveling system.
Figure 16B:
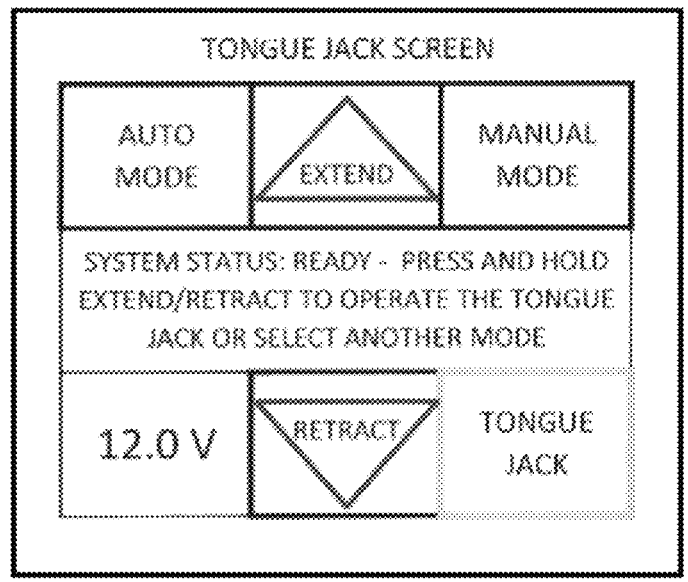
Figure 16C:
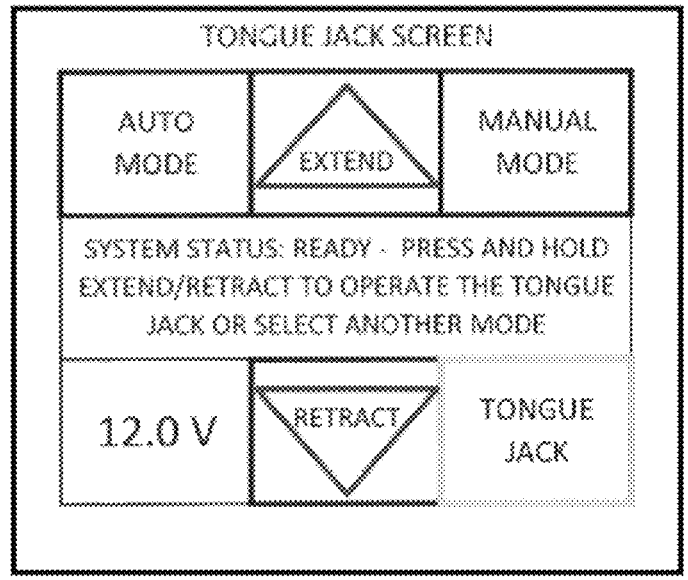
Figure 16D:
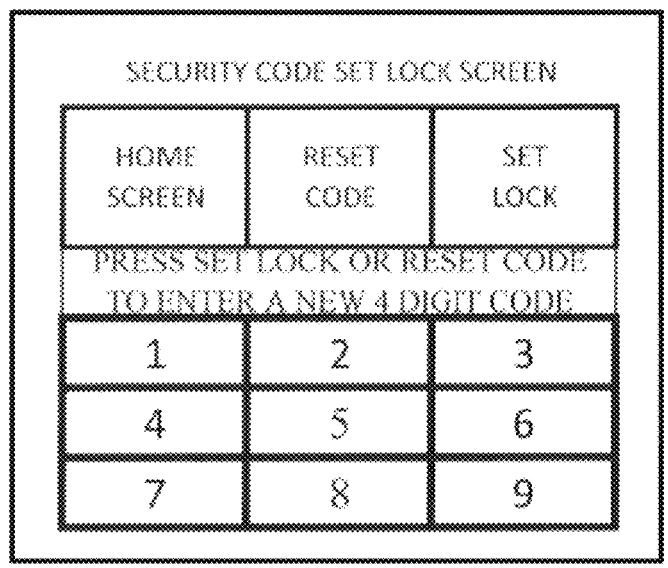
Figure 16E:
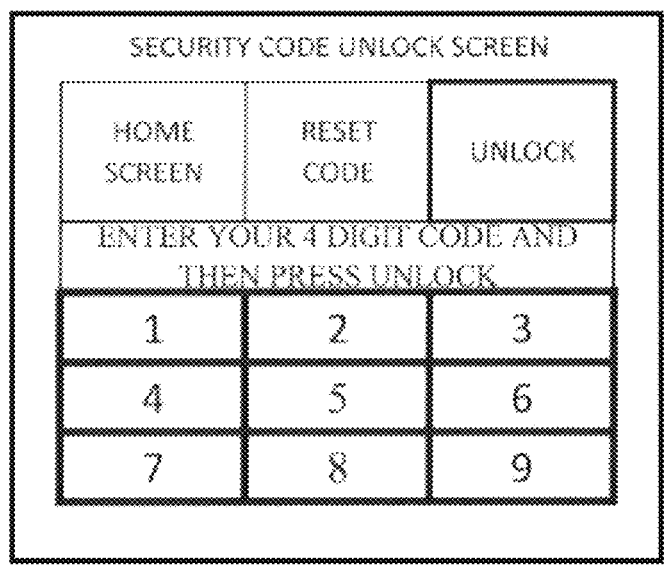
Figure 16F:
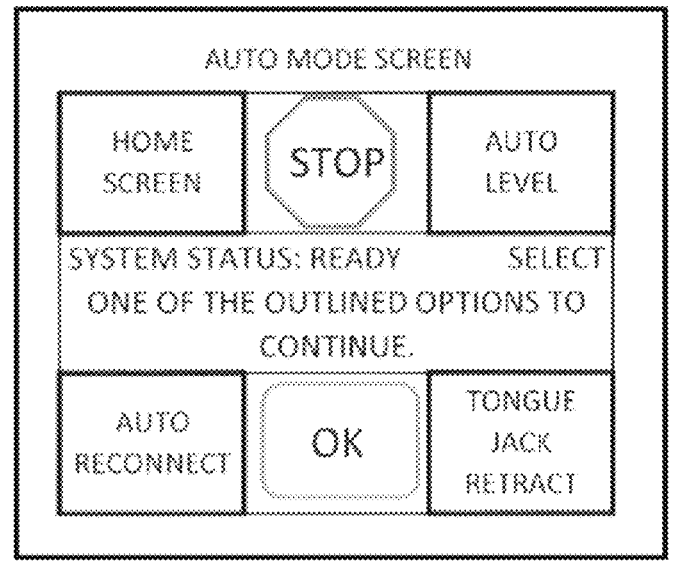
Figure 16G:
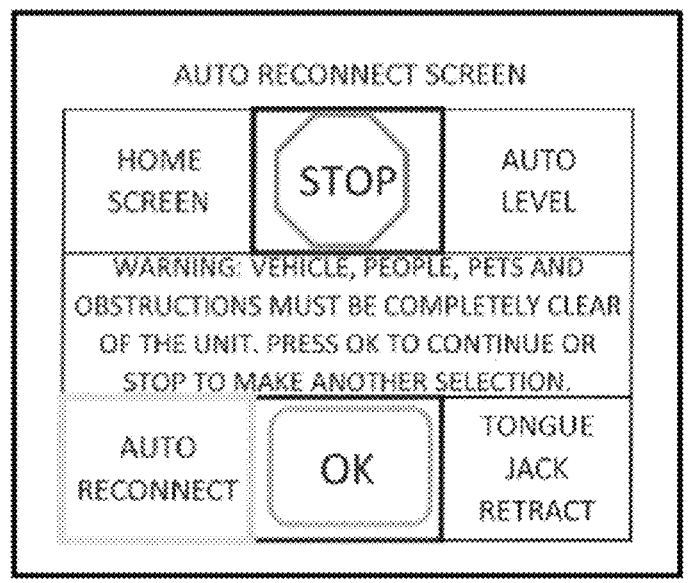
Figure 16H:
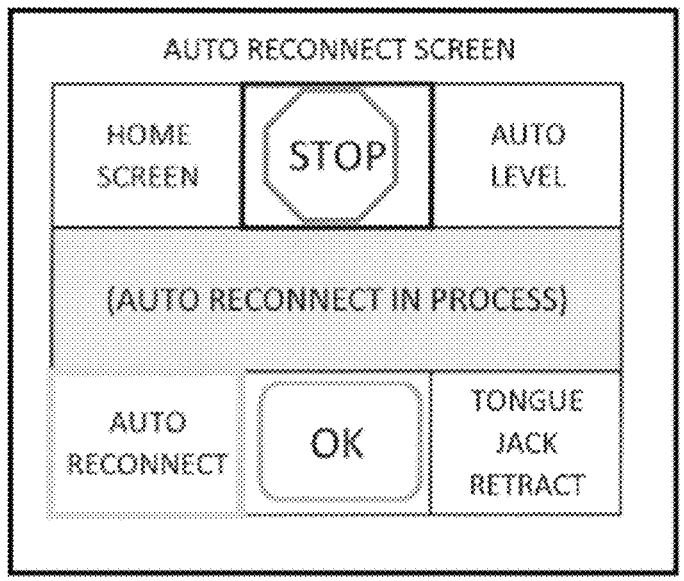
Figure 16I:
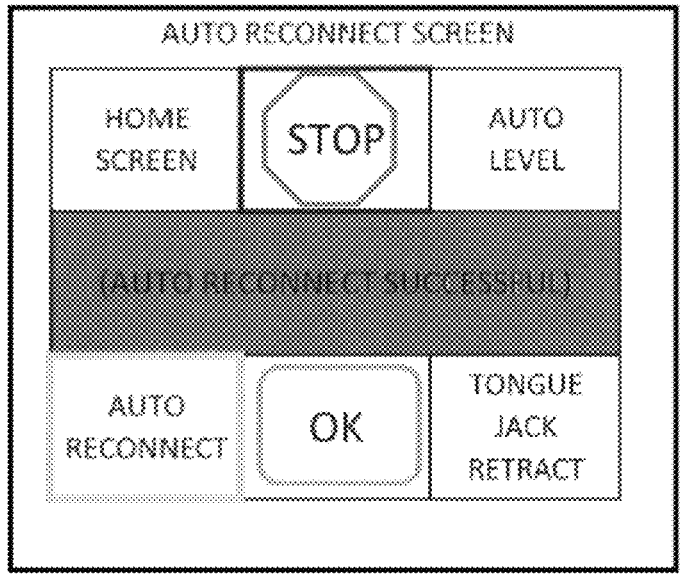
Figure 16J:
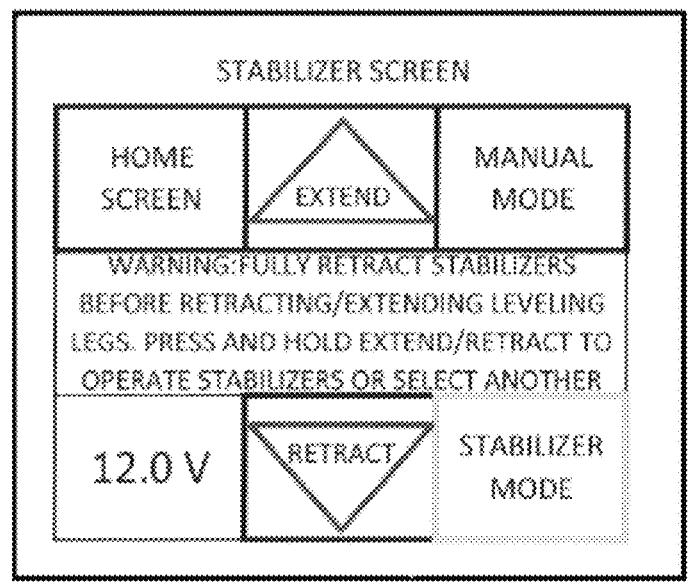
Figure 16K:
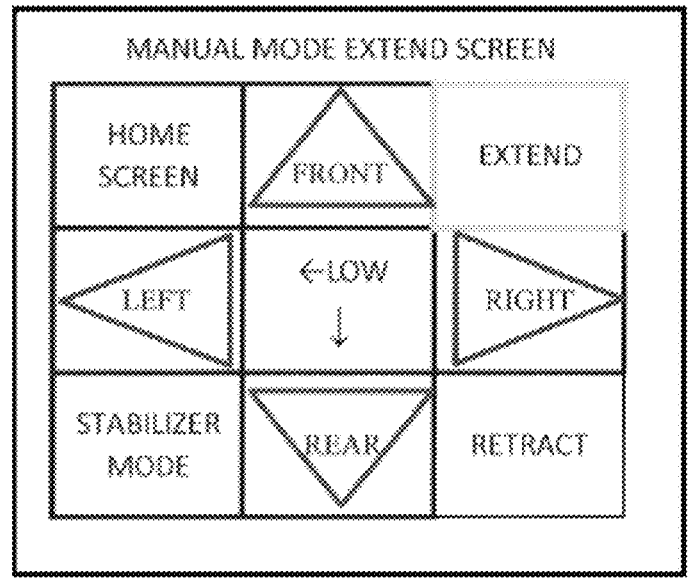
Figure 16L:
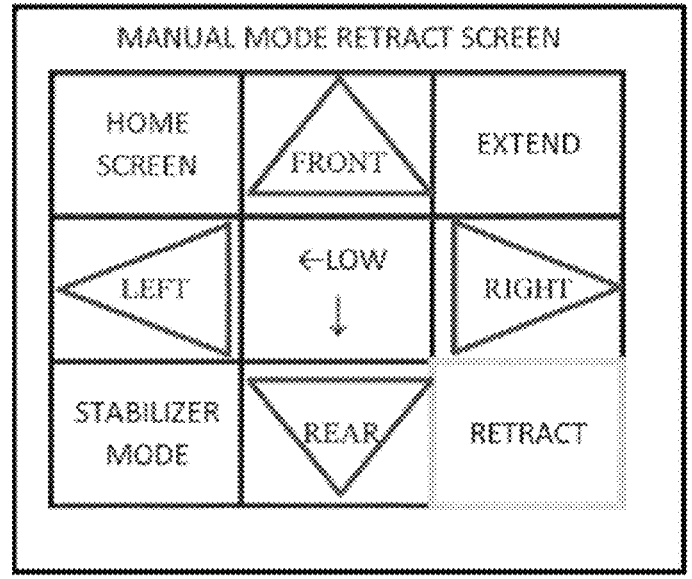
Figure 16M:
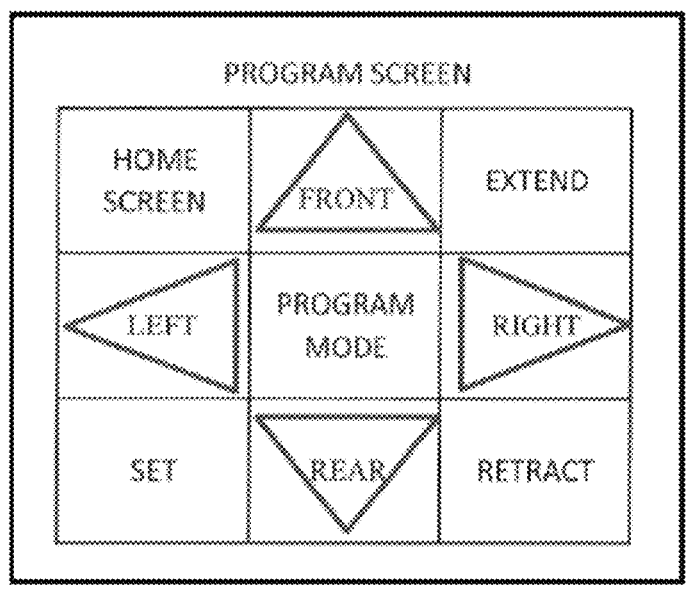
Figure 16N:
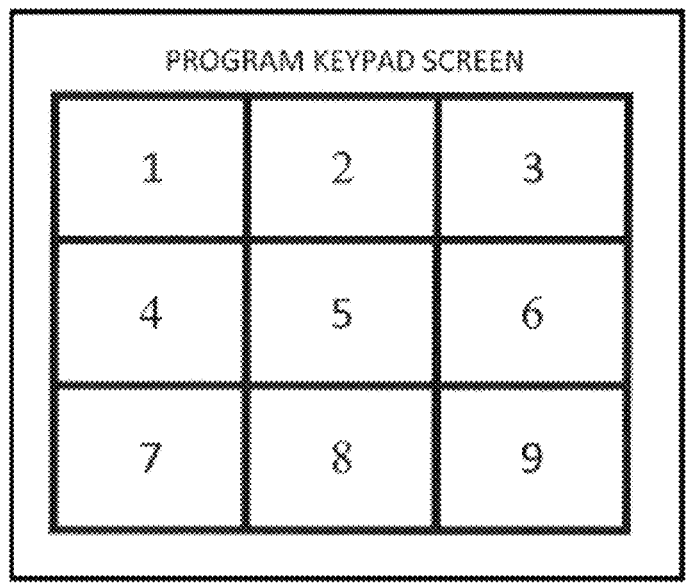
Figure 16O:
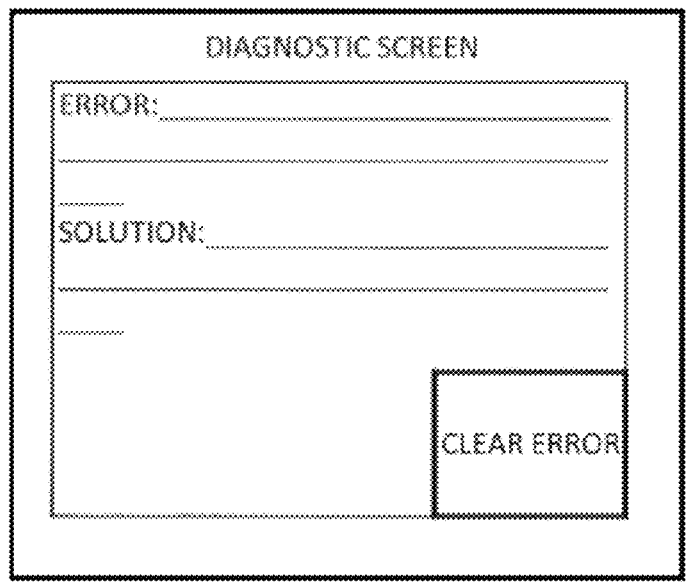
Figure 16P:
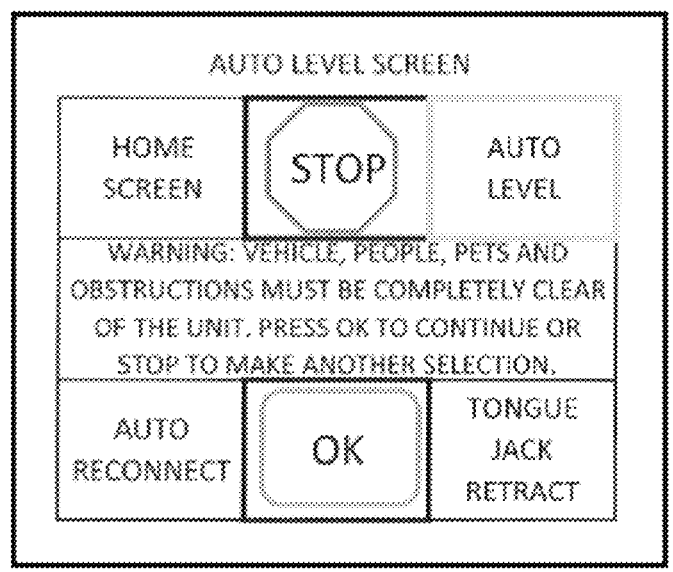
Figure 16Q:
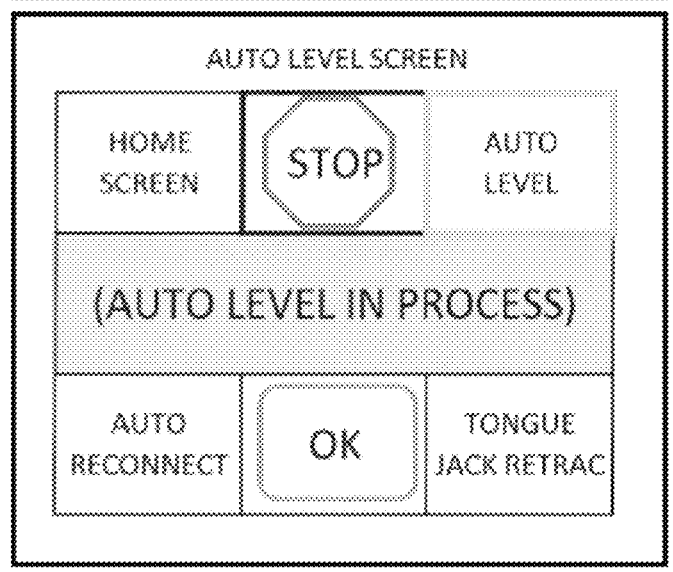
Figure 16R:
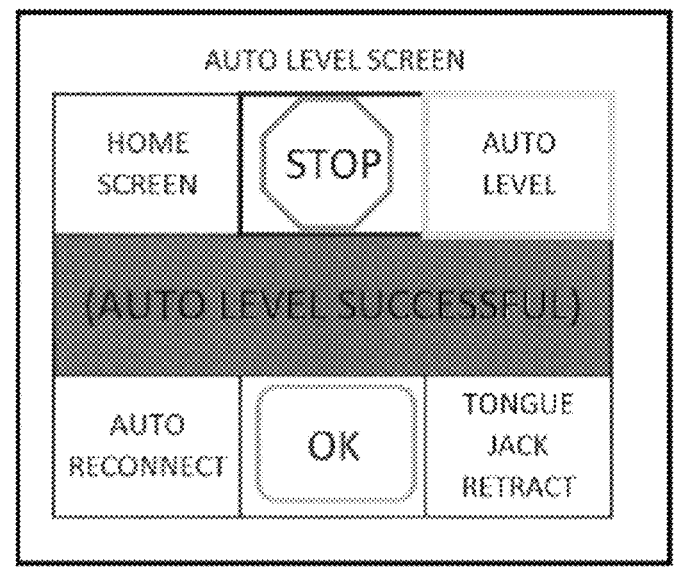
Figure 16S:
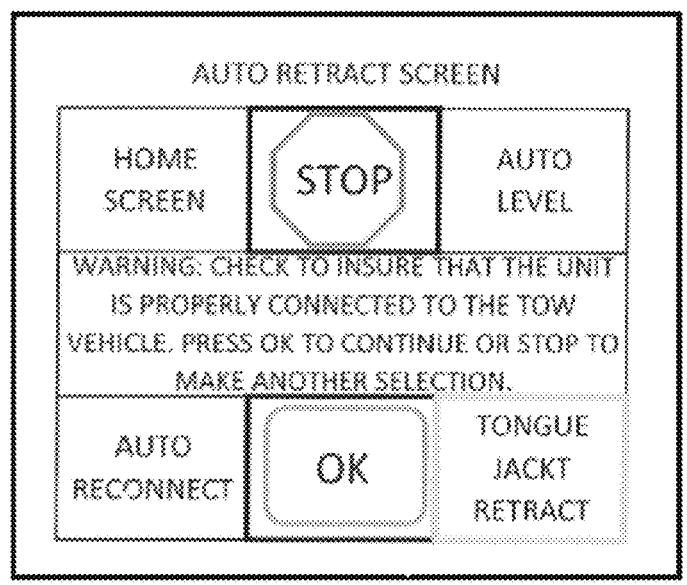
Figure 16T:
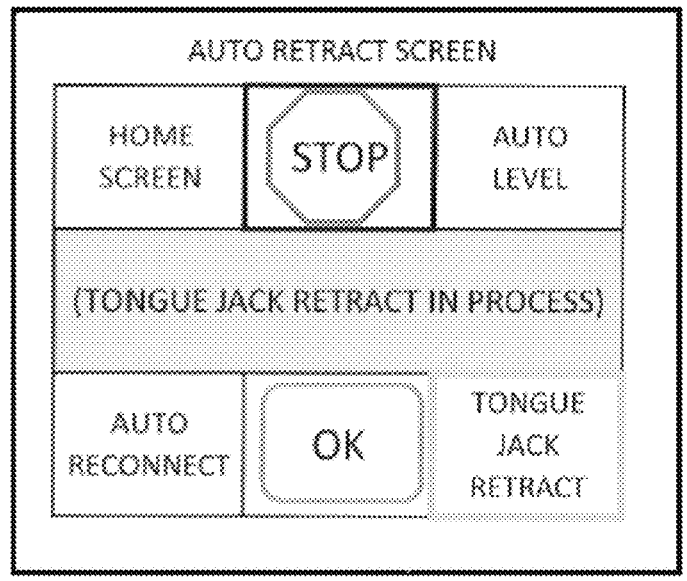
Figure 16U:
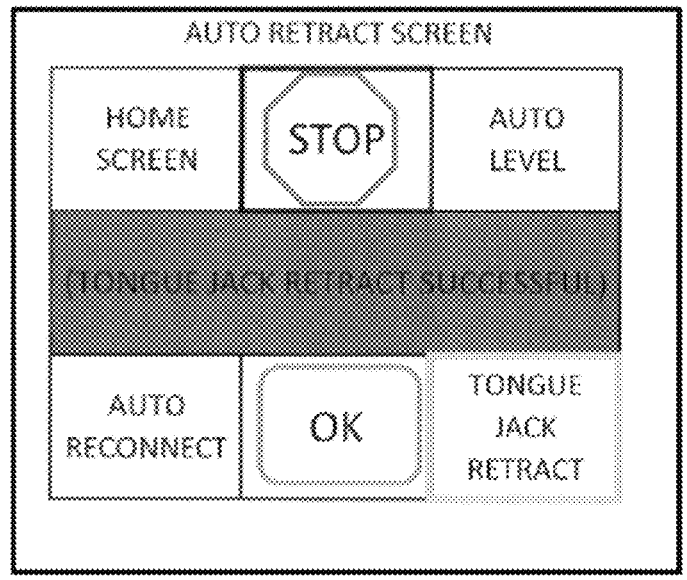

The foregoing leveling systems may be programmed with certain automatic or semi-automatic functions, and some of these functions may be illustrated with reference to FIGS. 16A-16U, which depict various user interface screens presented on the LED key pad 701 and leveling control touch pad 960 utilized in leveling systems 610 and 910, respectively. More specifically, FIGS. 16A-16U depict various leveling functions that users may access when utilizing leveling systems 610 and 910.

As previously mentioned, leveling systems 610 and 910 have variations modes including auto and manual modes. Moreover and as depicted in FIG. 16F, leveling systems 610 and 910 have various auto modes, such as TONGUE JACK RETRACT, AUTO LEVEL, and AUTO RETRACT (aka AUTO RECONNECT) modes.

The following is an example of how a user would operate the leveling system 610 via LED key pad 701. Assuming the tow vehicle is hitched to the (fifth wheel or travel) trailer, the user will need to unhitch and remove the vehicle. To do so, the user will press the TONGUE JACK button in FIG. 16A. Thereafter, the user may manually extend or retract the tongue jack. Note the leveling control touch pad 960 of the fifth wheel leveling system 910 will have a differently labeled button, for example, LANDING GEAR JACK. This is because fifth wheel trailers typically do not have tongue jacks. Nevertheless, operation would be identical despite the different labels.

Alternatively, the user may select an automated tongue jack unhitching feature labeled as AUTO UNHITCH. Again, this feature will be differently labeled in the leveling control touch pad 960 of the fifth wheel leveling system 910 as mentioned above. Nevertheless, in this mode, the portion of the trailer frame near fifth wheel nose or travel trailer A-frame is automatically raised to a predetermined height via the tongue jack or the one or more front landing gear, respectively. The user may then detach the tow vehicle from the trailer and remove the tow vehicle.

Once the tow vehicle is detached and removed from the (fifth wheel or travel) trailer, a user may press the manually or automatically level the trailer frame. The automatic mode, labeled AUTO LEVEL, will first automatically level fore and aft by extending or retracting the tongue jack to a level attitude as determined by the level sensor. For travel trailer leveling systems, this automatic mode will automatically level fore and aft and side to side by extending or retracting the one or more landing gear to a level attitude as determined by the level sensor. Thereafter, the first and second rear jacks are initiated to "fine-tune" the frame's attitude, both fore and aft and side to side. The first and second rear jacks, however, are not initiated simultaneously. Rather, the lower of the two rear jacks is initiated first. After the first and rear jacks have finished adjusting the attitude of the trailer frame to a level orientation, the trailer will be in a level orientation and the stabilization systems, if any, may be initiated to further secure the trailer frame and structure thereon by initiating the STABILIZER MODE.

The leveling systems disclosed herein contain an AUTO RECONNECT function, which is the opposite of the AUTO UNHITCH detailed above. In this mode, the stabilizers and rear jacks are raised to return the tongue jack to the level that it was at when the tow vehicle was initially unhitched (i.e., the unhitched position). The tow vehicle may then be reconnected to the trailer frame. Again, this same automatic function exists in the fifth wheel leveling system, but will comprise lowering the one or more landing gear to the unhitched position so that the tow vehicle may reconnect to the king pin.

In addition, the leveling system's user interfaces may include security protocols as detailed above to inhibit unauthorized access. Moreover, the user interface may provide users the ability to manually set the system's level point or even program their own leveling sequences. In such embodiments, the user interface may be require a code or other inputs that would permit a user to manually enter any information into the system and/or modify or create a leveling sequence. For example, a user may be required to depress a certain button to be provided such input access.

The leveling systems disclosed herein may also be remotely operated. As previously discussed, some embodiments of the presently disclosed leveling system include a remote device, which may be a "smart phone" or similar mobile device, such as a tablet, reader, smart watch, or other mobile smart device. The remote device includes a software application or "app" that provides certain functionality with respect to the leveling system. In such embodiments, the leveling system includes a controller and one or more levelers (as discussed above) capable of being extended or retracted to adjust the attitude of the vehicle structure or frame. In other embodiments, such leveling system may also include a multi-axis digital sensor mounted to the frame of the vehicle.

In various embodiments, the remote device may comprise a processor, a memory, a user interface and, optionally, a multi-axis digital sensor. The remote device is not affixed to the vehicle structure, but rather is freely movable with respect to the vehicle. The processor is operably connected to the memory, which is configured to store instructions to be executed on the processor. In one embodiment, the remote device user interface comprises a plurality of "buttons" and/or "switches" that each correspond to an individual leveler or a group of levelers, and a user may manipulate such buttons or switches to manually actuate the levelers as desired without any motor control. In this embodiment, the user may individually actuate each leveler one at a time, or may actuate two or more levelers simultaneously by pressing two or more buttons simultaneously. Also in this embodiment, a user may determine how much manual extension or retraction to impart to any given leveler based on his or her visual inspection of the structure to be leveled or based on some other visual indication/feedback that may be provided on the remote device or provided elsewhere, for example, via a bubble level that may be mounted at numerous locations on the structure or otherwise integrated into the leveling system (e.g., the tongue jack user interface 702).

Automatic leveling procedures may be provided in other embodiments. For example, the remote device may be a mobile device with an integrated multi-axis digital sensor that provides readings from a plurality of axes describing the angular orientation of the remote device. Because the remote device is not affixed to the vehicle structure, the axes of the remote device are typically not aligned with the axes of the structure. The processor may, therefore, be configured to use the readings from the digital sensor (where utilized) to calculate an angular orientation of a selected portion of the structure, such as the portion of the structure upon which the remote device is placed. Some prior art systems, in contrast, required elaborate calibration to establish predefined attitudes in an attempt to level discrete portions of the structure. The presently disclosed system, in contrast, enables leveling of any portion of the structure as selected by the placement of the remote device. The system determines that the selected portion of the structure has achieved a leveled (or other desired attitude) based on the multi-axis digital sensor of the remote device.

The remote device wirelessly communicates with the controller of the leveling system. As previously noted, the wireless communication may be achieved using microwave communication, infrared short-range communication, near field communication, BlueTooth™, WiFi™, and other radio frequency communication technologies, or combinations thereof. The remote device and the leveling system controller may each contain a transmitter and receiver, or transceiver, to enable such communication. In the embodiment where the remote device user interface is similarly configured to the user interface of FIGS. 7C-7D, a user's manipulation of any "button" or "switch" in the remote device's user interface generates a leveler control signal that is sent to the leveling system controller, thereby causing the one or more levelers to extend or retract. In a second example operation, the remote device processor receives the reading from the digital sensor and determines leveler control signals based on those readings. It will be appreciated, however, that numerous other manual, semi-auto, or automatic leveling procedures are contemplated herein.

The leveler control signals are communicated to the leveling system controller, which causes the one or more levelers to extend or retract. In embodiments where the remote device includes the digital sensor, the one or more levelers could be programmed to automatically move the selected portion of the structure into a level or other desired attitude. In embodiments without a remote device digital sensor (or that do not utilize the digital sensor), a user could manually activate the controls in the remote device user interface, thereby causing levelers to extend or retract as desired by the user and without additional motor control.

In other embodiments, the leveling system controller receives leveler operation data, such as leveler extension speed, leveler motor power draw, or other monitored parameters associated with operation of the levelers, such as the output of a leveler ground contact sensor. The leveling system controller may communicate the leveler operation data to the remote device, which may then be used as additional input for the attitude adjustment operation or for diagnostic or other purposes.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While structures, systems and methods are described in terms of "comprising," "containing," or "including" various components or steps, the structures, systems and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A leveling system for adjusting an attitude of a structure defining a lateral pitch axis and a longitudinal roll axis, comprising:
a level sensor in electronic communication with a user interface and configured to measure the attitude of the structure;
at least three leveling zones configured to adjust the attitude of the structure based upon instructions received from the user interface operatively connected to each of the at least three leveling zones, wherein the first leveling zone is arranged at a front end of the structure and is configured to level the structure fore and aft about the lateral pitch axis based on the attitude of the structure as determined by the level sensor, and wherein the second and third leveling zones are configured to stabilize the structure about the lateral pitch axis and the longitudinal roll axis when deployed after the first leveling zone;
wherein the second leveling zone and the third leveling zone each comprise a stabilizer system having a pair of spaced apart stabilizer legs and a motor associated with each leg of the pair of stabilizer legs, the stabilizer motors being configured to extend and retract the stabilizer leg associated therewith in response to a stabilizer signal received from the user interface.

2. The leveling system of claim 1, wherein the second and third leveling zones are further configured to adjust the attitude of the structure about the lateral pitch axis and the longitudinal roll axis when deployed after deployment of the first leveling zone.

3. The leveling system of claim 1, wherein each of the leveling zones are manually activated via the user interface.

4. The leveling system of claim 1, wherein the user interface is configured to control operation of the first leveling zone independent of the second and third leveling zones.

5. The leveling system of claim 1, wherein the user interface is configured to simultaneously control operation of the second and third leveling zones.

6. The leveling system of claim 5, wherein the user interface includes a switch for extending or retracting the second leveling zone and the third leveling zone together.

7. The leveling system of claim 1, wherein the user interface is configured to control operation of the second leveling zone and the third leveling zone independent of each other.

8. The leveling system of claim 7, wherein the user interface includes a first leveling switch for extending or retracting the second leveling zone and a second leveling switch for extending or retracting the third leveling zone.

9. The leveling system of claim 1, wherein the first leveling zone comprises a jack arranged at a front end of the structure.

10. The leveling system of claim 9, wherein the third leveling zone is arranged at a rear end of the structure and the second leveling zone is arranged on the structure between the first leveling zone and the third leveling zone.

11. The leveling system of claim 9, further comprising at least one additional pair of jacks arranged between the jack and the rear end of the structure.

12. The leveling system of claim 1, wherein the structure is a travel trailer and the first leveling zone comprises a tongue jack arranged at a front end of the travel trailer.

13. The leveling system of claim 12, wherein the user interface is integrated into a housing assembly of the tongue jack.

14. The leveling system of claim 13, wherein the housing assembly includes a lid and a locking mechanism configured to lock the housing assembly when the lid is in a closed position.

15. The leveling system of claim 12, wherein the user interface is integrated into an exterior sidewall of an enclosure of the travel trailer and/or integrated inside an interior compartment of the enclosure.

16. The leveling system of claim 1, wherein the stabilizer motors each include a mechanical slip clutch configured to inhibit further extension of the stabilizer leg associated therewith after grounding of the stabilizer leg associated therewith.

17. The leveling system of claim 1, wherein each of the stabilizer systems is configured to cease extension of the first stabilizer leg and/or the second stabilizer leg upon sensing increasing amp draw.

18. The leveling system of claim 1, wherein the level sensor is configured to display an indication of the attitude of the structure.

19. The leveling system of claim 1, wherein each of the first and second stabilizer systems comprise a stabilizer housing configured to house the each stabilizer motor therein, and wherein each leg of each pairs of stabilizer legs extends and retracts from the stabilizer housing.

20. A leveling system for adjusting an attitude of a structure defining a lateral pitch axis and a longitudinal roll axis, comprising:
- a jack arranged at a front end of the structure configured to adjust the attitude of the structure based upon instructions received from an operatively connected user interface;
- a first stabilizer system arranged at a rear end of the structure comprising:
  - a first stabilizer housing;
  - a first pair of stabilizer legs extending from the first stabilizer housing and,
  - a motor associated with each leg of the first pair of stabilizer legs and disposed within the first stabilizer housing;
- a second stabilizer system arranged on the structure between the jack and the first stabilizer system and comprising a second pair of stabilizer legs and a motor associated with each leg of the second pair of stabilizer legs, wherein first and second stabilizer systems are configured to stabilize the structure about the lateral pitch axis and the longitudinal roll axis when deployed after the jack.

* * * * *